(12) United States Patent
Iwasaki

(10) Patent No.: US 11,314,438 B2
(45) Date of Patent: Apr. 26, 2022

(54) ARITHMETIC PROCESSING DEVICE, INFORMATION PROCESSING DEVICE, AND CONTROL METHOD FOR ARITHMETIC PROCESSING DEVICE

(71) Applicant: FUJITSU LIMITED, Kawasaki (JP)

(72) Inventor: Shinichi Iwasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 16/695,282

(22) Filed: Nov. 26, 2019

(65) Prior Publication Data
US 2020/0201556 A1 Jun. 25, 2020

(30) Foreign Application Priority Data

Dec. 21, 2018 (JP) .............................. JP2018-239503

(51) Int. Cl.
*G06F 9/38* (2018.01)
*G06F 9/30* (2018.01)
*G06F 12/0882* (2016.01)
*G06F 12/0868* (2016.01)
*G06F 12/0855* (2016.01)
(Continued)

(52) U.S. Cl.
CPC .......... *G06F 3/0647* (2013.01); *G06F 3/0611* (2013.01); *G06F 3/0679* (2013.01); *G06F 9/3001* (2013.01); *G06F 9/3842* (2013.01); *G06F 12/0815* (2013.01); *G06F 12/0246* (2013.01)

(58) Field of Classification Search
CPC .... G06F 3/0647; G06F 3/0611; G06F 3/0679; G06F 9/3001; G06F 9/3842; G06F 12/0815; G06F 12/0246; G06F 12/0859; G06F 2212/1024; G06F 2212/214; G06F 2212/313; G06F 2212/507; G06F 12/0868; G06F 12/0882
See application file for complete search history.

(56) References Cited

U.S. PATENT DOCUMENTS 5,742,792 A * 4/1998 Yanai ................... G06F 11/2074
711/162
6,249,851 B1 * 6/2001 Richardson ......... G06F 12/0859
711/141
(Continued)

FOREIGN PATENT DOCUMENTS

JP 2017-220237 A 12/2017

*Primary Examiner* — Christopher D Birkhimer
(74) *Attorney, Agent, or Firm* — Fujitsu Patent Center

(57) ABSTRACT

An arithmetic processing device includes an arithmetic circuit and a memory access controller performing access control for a read request on a memory module including a volatile memory and a nonvolatile memory, the volatile memory operating as a cache of the nonvolatile memory. The memory access controller stores an address table on which unit addresses including a request address of the read request are registered, issues a speculative read to the memory module in response to the read request and update the address table when the request address is included in the unit addresses in the address table, and issues a normal read when the request address is not included in any of the unit addresses. When the normal read is issued, read data is received after transmitting a transmission request signal. When the speculative read is issued, read data are acquired when receiving a hit flag.

11 Claims, 21 Drawing Sheets

(51) Int. Cl.
*G06F 12/0815* (2016.01)
*G06F 12/02* (2006.01)
*G06F 3/06* (2006.01)

(56) References Cited

U.S. PATENT DOCUMENTS

| | | | |
|---|---|---|---|
| 2003/0097531 A1* | 5/2003 | Arimilli | G06F 12/0831 711/146 |
| 2004/0039880 A1* | 2/2004 | Pentkovski | G06F 12/0811 711/146 |
| 2006/0143406 A1* | 6/2006 | Chrysos | G06F 12/084 711/143 |
| 2006/0156155 A1* | 7/2006 | Gurumurthi | G06F 11/0793 714/746 |
| 2017/0357604 A1 | 12/2017 | Lim et al. | |

* cited by examiner

FIG. 10

| CMD | DRAM($) | |
|---|---|---|
| | Hit | Miss |
| XREAD | 60ns | AVERAGE 300ns |
| SREAD | 30ns | AVERAGE 400ns |

FIG. 19

CASE IN WHICH PAGE ADDRESS TABLE IS UPDATED EVERY TIME MISS OCCURS
SREAD ISSUED ONCE

| TIME | ADDRESS | XREAD/SREAD |
|---|---|---|
| 0 | 1BB4 | XREAD |
| 1 | 69B1 | XREAD |
| 2 | 24EE | XREAD |
| 3 | 0CA3 | XREAD |
| 4 | 3987 | XREAD |
| 5 | 5A4D | XREAD |
| 6 | 709A | XREAD |
| 7 | 48B4 | XREAD |
| 8 | 00A2 | XREAD |
| 9 | 5F40 | SREAD |
| 10 | 600A | XREAD |
| 11 | 308F | XREAD |
| 12 | 2F00 | XREAD |
| 13 | 1FB0 | XREAD |
| 14 | 4CAF | XREAD |
| 15 | 7AAA | XREAD |
| 16 | 3002 | XREAD | t →

TIME0-3
| P | P_ADD_TABLE | | | | |
|---|---|---|---|---|---|
| 0 | 1 | x | x | x | x |
| 1 | 6 | x | x | x | x |
| 2 | 2 | x | x | x | x |
| 3 | 0 | x | x | x | x |

TIME4
| P | P_ADD_TABLE | | | | |
|---|---|---|---|---|---|
| 0 | 3 | x | x | x | x |
| 1 | 6 | x | x | x | x |
| 2 | 2 | x | x | x | x |
| 3 | 0 | x | x | x | x |

TIME5
| P | P_ADD_TABLE | | | | |
|---|---|---|---|---|---|
| 0 | 3 | x | x | x | x |
| 1 | 5 | x | x | x | x |
| 2 | 2 | x | x | x | x |
| 3 | 0 | x | x | x | x |

TIME6
| P | P_ADD_TABLE | | | | |
|---|---|---|---|---|---|
| 0 | 3 | x | x | x | x |
| 1 | 5 | x | x | x | x |
| 2 | 7 | x | x | x | x |
| 3 | 0 | x | x | x | x |

TIME7
| P | P_ADD_TABLE | | | | |
|---|---|---|---|---|---|
| 0 | 3 | x | x | x | x |
| 1 | 5 | x | x | x | x |
| 2 | 7 | x | x | x | x |
| 3 | 4 | x | x | x | x |

TIME8-9
| P | P_ADD_TABLE | | | | |
|---|---|---|---|---|---|
| 0 | 0 | x | x | x | x |
| 1 | 5 | x | x | x | x |
| 2 | 7 | x | x | x | x |
| 3 | 4 | x | x | x | x |

TIME10
| P | P_ADD_TABLE | | | | |
|---|---|---|---|---|---|
| 0 | 0 | x | x | x | x |
| 1 | 6 | x | x | x | x |
| 2 | 7 | x | x | x | x |
| 3 | 4 | x | x | x | x |

TIME11
| P | P_ADD_TABLE | | | | |
|---|---|---|---|---|---|
| 0 | 0 | x | x | x | x |
| 1 | 6 | x | x | x | x |
| 2 | 3 | x | x | x | x |
| 3 | 4 | x | x | x | x |

TIME12
| P | P_ADD_TABLE | | | | |
|---|---|---|---|---|---|
| 0 | 0 | x | x | x | x |
| 1 | 6 | x | x | x | x |
| 2 | 3 | x | x | x | x |
| 3 | 2 | x | x | x | x |

TIME13
| P | P_ADD_TABLE | | | | |
|---|---|---|---|---|---|
| 0 | 1 | x | x | x | x |
| 1 | 6 | x | x | x | x |
| 2 | 3 | x | x | x | x |
| 3 | 2 | x | x | x | x |

TIME14
| P | P_ADD_TABLE | | | | |
|---|---|---|---|---|---|
| 0 | 1 | x | x | x | x |
| 1 | 4 | x | x | x | x |
| 2 | 3 | x | x | x | x |
| 3 | 2 | x | x | x | x |

TIME15
| P | P_ADD_TABLE | | | | |
|---|---|---|---|---|---|
| 0 | 1 | x | x | x | x |
| 1 | 4 | x | x | x | x |
| 2 | 7 | x | x | x | x |
| 3 | 2 | x | x | x | x |

TIME16
| P | P_ADD_TABLE | | | | |
|---|---|---|---|---|---|
| 0 | 1 | x | x | x | x |
| 1 | 4 | x | x | x | x |
| 2 | 7 | x | x | x | x |
| 3 | 3 | x | x | x | x |

FIG. 20

CASE IN WHICH PAGE ADDRESS TABLE IS UPDATED ONCE EVERY N (= 16) READS
SREAD ISSUED 4 TIMES

| TIME | ADDRESS | | |
|---|---|---|---|
| 0 | 1BB4 | XREAD | |
| 1 | 69B1 | XREAD | |
| 2 | 24EE | XREAD | |
| 3 | 0CA3 | XREAD | |
| 4 | 3987 | XREAD | |
| 5 | 5A4D | XREAD | |
| 6 | 709A | XREAD | |
| 7 | 48B4 | XREAD | |
| 8 | 00A2 | | SREAD |
| 9 | 5F40 | XREAD | |
| 10 | 600A | | SREAD |
| 11 | 308F | XREAD | |
| 12 | 2F00 | | SREAD |
| 13 | 1FB0 | | SREAD |
| 14 | 4CAF | XREAD | |
| 15 | 7AAA | XREAD | |
| 16 | 3002 | XREAD | |

TIME0-15

| P | P_ADD_TABLE | | | |
|---|---|---|---|---|
| 0 | 1 | x | x | x |
| 1 | 6 | x | x | x |
| 2 | 2 | x | x | x |
| 3 | 0 | x | x | x |

TIME16

| P | P_ADD_TABLE | | | |
|---|---|---|---|---|
| 0 | 3 | x | x | x |
| 1 | 6 | x | x | x |
| 2 | 2 | x | x | x |
| 3 | 0 | x | x | x |

FIG. 21
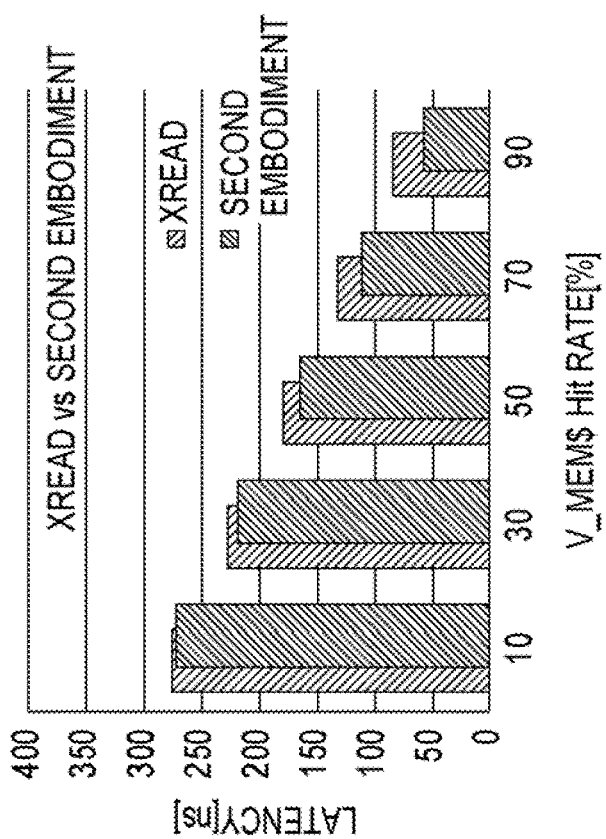
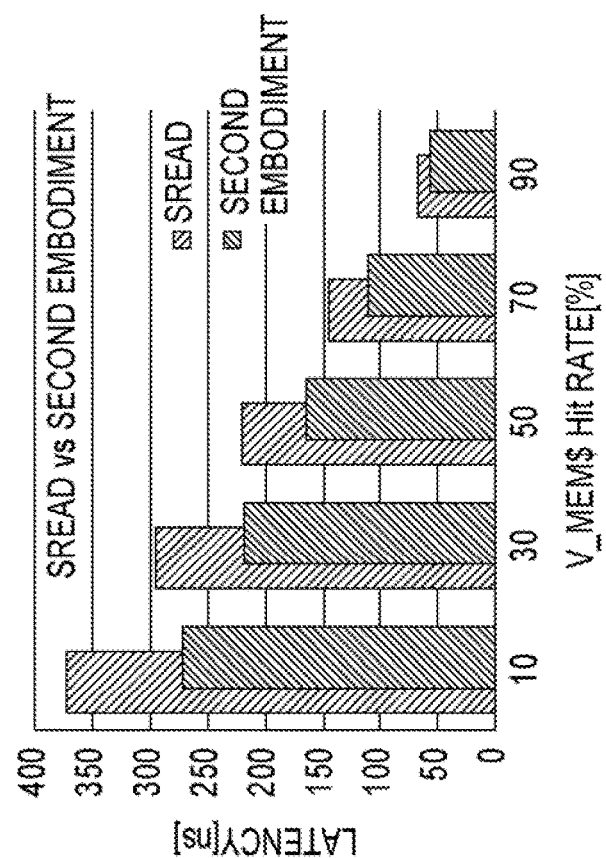

ARITHMETIC PROCESSING DEVICE, INFORMATION PROCESSING DEVICE, AND CONTROL METHOD FOR ARITHMETIC PROCESSING DEVICE

CROSS-REFERENCE TO RELATED APPLICATION

This application is based upon and claims the benefit of priority of the prior Japanese Patent Application No. 2018-239503, filed on Dec. 21, 2018, the entire contents of which are incorporated herein by reference.

FIELD

The present invention relates to an arithmetic processing device, an information processing device, and a control method for the arithmetic processing device.

BACKGROUND

A DRAM module, which is a volatile memory, is mainly used as the main storage device of a personal computer or a server. Meanwhile, in industries where high-frequency trading is performed, such as financial markets, for example, it is important to increase the processing speed of personal computers and servers. For this purpose, in-memory databases, in which is reduced by expanding a part of a database in a secondary storage device such as a solid state drive (SSD) or a hard disk drive (HDD), for example, is expanded in the main storage device to reduce access to the secondary storage, have come to attention.

In response to the demand described above, devices in which a memory element having a larger storage capacity than a DRAM is mounted in a memory module of the DRAM have been developed. One of these devices is a device in which a volatile memory such as a DRAM, which has a high unit price but can be accessed at high speed, and a nonvolatile memory such as a NAND type flash memory, which has a low unit price and a large capacity, are mounted in a single memory module. An example thereof is a nonvolatile dual in line memory module (NVDIMM). This memory module is a large-capacity, nonvolatile memory module in which a DRAM is used as a cache.

Such device is disclosed in Japanese Laid-open Patent Publication No. 2017-220237

SUMMARY

In a memory module (referred to hereafter as a nonvolatile memory module) mounting both a volatile memory and a nonvolatile memory, such as an NVDIMM, the DRAM, which serves as the volatile memory, is used as the cache of the large-capacity nonvolatile memory. In a nonvolatile memory module, if a hit occurs in the DRAM cache upon receipt of a normal read, the latency up to data acquisition is short, but if a miss occurs in the DRAM cache, the nonvolatile memory is accessed, leading to an increase in latency. As a result, the nonvolatile memory module transmits data to the host out of order, i.e. in a different order to the read order. In a read protocol, handshakes are performed between the host and the memory module to exchange signals between reading and data acquisition, and therefore the latency is longer than that of the memory module of the DRAM.

With a nonvolatile memory module, however, a speculative read, in which data can be acquired without handshakes and therefore a latency is shorter than normal reads, can be used. In the case of the speculative read, the latency is shorter than that of a normal read when the DRAM cache is hit but longer than that of a normal read when the DRAM cache is missed.

One aspect of an embodiment is an arithmetic processing device comprising: an arithmetic circuit configured to issue a read request to a memory; and a memory access controller configured to perform access control corresponding to the read request from the arithmetic circuit on a memory module having a volatile memory, which has a first capacity and is able to read with a first latency, and a nonvolatile memory, which has a second capacity that is larger than the first capacity and is able to read with a second latency that is longer than the first latency, the volatile memory operating as a cache of the nonvolatile memory, wherein the memory access controller is configured to:

store an address table including a plurality of entries in which unit addresses each of which includes a request address of the read request from the arithmetic circuit are registered;

issue a speculative read to the memory module in response to receiving the read request in a first case in which the request address is included in one of the unit addresses stored in the address table;

issue a normal read to the memory module in response to receiving the read request and replace one of the unit addresses registered in the address table with a unit address that includes the request address of the read request that is received in a second case in which the request address is not included in any of the unit addresses registered on the address table;

when the normal read is issued, transmit a transmission request signal in response to a read-ready signal from the memory module and receive read data after a first time elapses following transmission of the transmission request signal; and when the speculative read is issued, acquire read data when receiving a hit flag and the read data from the memory module and not acquire the read data when receiving a miss flag and the read data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a view of a table illustrating examples of the latency of the nonvolatile memory module.

FIG. 19 is a view depicting an example operation in a case where the memory access controller updates the page address table every time a miss occurs.

FIG. 20 is a view depicting an example operation in which the memory access controller updates the page address table once every N read requests.

FIG. 21 is a view depicting a comparison between a case in which either only the normal read XREAD is issued or only the speculative read SREAD is issued and a case such as that of the second embodiment, in which either XREAD or SREAD is issued depending on whether a hit is obtained on the page address table.

DESCRIPTION OF EMBODIMENTS

Figure 1:
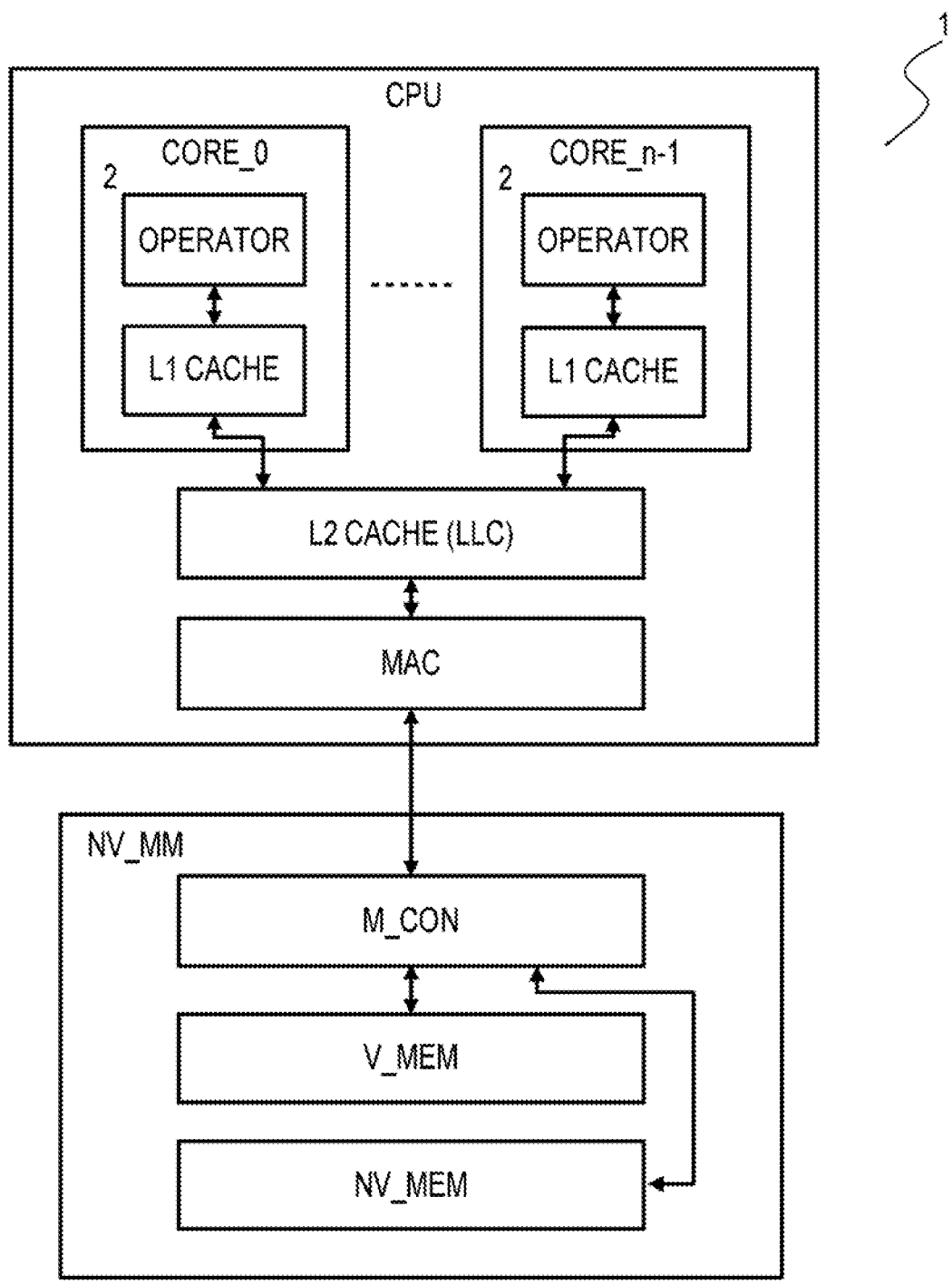
FIG. 1 is a view depicting example configurations of an arithmetic processing device and a nonvolatile memory module according to this embodiment.

Arithmetic Processing Device and Nonvolatile Memory Module according to This Embodiment FIG. 1 is a view depicting example configurations of an arithmetic processing device and a nonvolatile memory module according to this embodiment. An information processing device 1 includes an arithmetic processing device (a processor or a Central Processor Unit (CPU); referred to hereafter as the processor) CPU and a nonvolatile memory module NV_MM. The processor CPU uses the nonvolatile memory module as a main memory.

The processor CPU includes arithmetic cores CORE_0 to CORE_n-1 serving as n (n being a plurality) arithmetic circuits, each having an operator 2 and a level 1 cache L1_CACHE, a level 2 cache L2_CACHE provided in common for the plurality of arithmetic cores (referred to simply as "the cores" hereafter), and a memory access controller MAC. The memory access controller may be constituted by a different chip to the processor CPU. Moreover, a single or a plurality of the processor CPU may be provided.

Further, the nonvolatile memory module MV_MM includes a memory controller M_CON, a volatile memory V_MEM such as a DRAM, and a nonvolatile memory NV_MEM such as a NAND type flash memory. The volatile memory V_MEM is used as a cache of the nonvolatile memory NV_MEM. Accordingly, a cache tag is stored in the volatile memory V_MEM.

In each of the cores CORE, an instruction issuing unit, not depicted in the figure, including an instruction fetcher and an instruction decoder issues instructions, and the operator 2 executes the issued instructions. When executing an issued instruction involves memory access, the core issues a memory request requesting access to the memory. Memory requests include read requests and write requests. When the issued memory request is a cache hit, the L1 cache L1_CACHE executes the memory request, which includes reading data from or writing data to the L1 cache, and when the memory request is a cache miss, a further memory request is issued to the L2 cache L2_CACHE.

In response to the memory requests issued from the plurality of cores, the L2 cache L2_CACHE, similarly to the L1 cache, executes the memory requests with respect to the data in the L2 cache when the issued memory request is a cache hit and issues a further memory request to the memory access controller MAC when the memory request is a cache miss.

Reading by Nonvolatile Memory Module

Operations performed by the memory access controller MAC and the nonvolatile memory module NV_MM in a case where the memory request is a read request will now be described briefly. As noted above, the nonvolatile memory module NV_MM includes the memory controller M_CON, the volatile memory V_MEM, such as a DRAM, and the nonvolatile memory NV_MEM, such as a NAND type flash memory. The volatile memory V_MEM is used as the cache of the nonvolatile memory NV_MEM. Further, the read latency of the volatile memory V_MEM is shorter than that of the nonvolatile memory NV_MEM, whereas the data capacity of the volatile memory is smaller than that of the nonvolatile memory.

Moreover, reading to the nonvolatile memory module is performed in byte units (one byte or a plurality of bytes). Reading to the volatile memory V_MEM is also performed in byte units. Reading to the nonvolatile memory NV_MEM, however, is performed in page units, which have a larger capacity than byte units.

When a cache hit is obtained in the volatile memory in response to a read from the memory access controller MAC, the memory controller M_CON transmits the byte unit data at the read destination in the volatile memory V_MEM to the memory access controller MAC. When a cache miss is obtained, on the other hand, data in a page area including the read address within the nonvolatile memory NV_MEM are registered (stored) in the volatile memory V_MEM, whereupon the data in the page area corresponding to the read address are transmitted to the memory access controller MAC.

When the volatile memory V_MEM is a DRAM, the read latency, similarly to that of a DRAM, is short. Therefore, when a cache hit is obtained, the nonvolatile memory module transmits the data in the volatile memory V_MEM to the memory access controller, and as a result, a similar reduction in read latency to that achieved with a DRAM is realized. When a cache miss is obtained, on the other hand, the nonvolatile memory module transmits the data in the nonvolatile memory NV_MEM to the memory access controller MAC, and as a result, the read latency becomes longer than that of a DRAM.

The read latency differs according to the state inside the memory module, and therefore the volatile memory module V_MM transmits read data to the memory access controller MAC out of order rather than in read order. In consideration of this out-of-order data response, the nonvolatile memory module NV_MM is configured to support two types of reads, namely normal reads and speculative reads. A normal read is a non-speculative read, i.e. not a speculative read.

As noted above, the volatile memory V_MEM is used as the cache of the nonvolatile memory NV_MEM, and therefore the nonvolatile memory module NV_MM includes storage means equivalent to a cache tag for registering address information relating to the data stored in the volatile memory, for example. The cache tag is provided in the volatile memory V_MEM, for example, but may be provided in the memory controller M_CON. Further, when a cache miss occurs, data in a page area that includes the data at the read destination within the nonvolatile memory are registered in the volatile memory, and address information (information indicating a predetermined unit address or information indicating a page address) of the page area including the read destination address is registered in the cache tag, for example. Note that requirements relating to the cache control described above are not included in the intended scope of the volatile memory module.

Next, the normal read and the speculative read supported by the nonvolatile memory module will be described.

Normal Read XREAD

Figure 2:
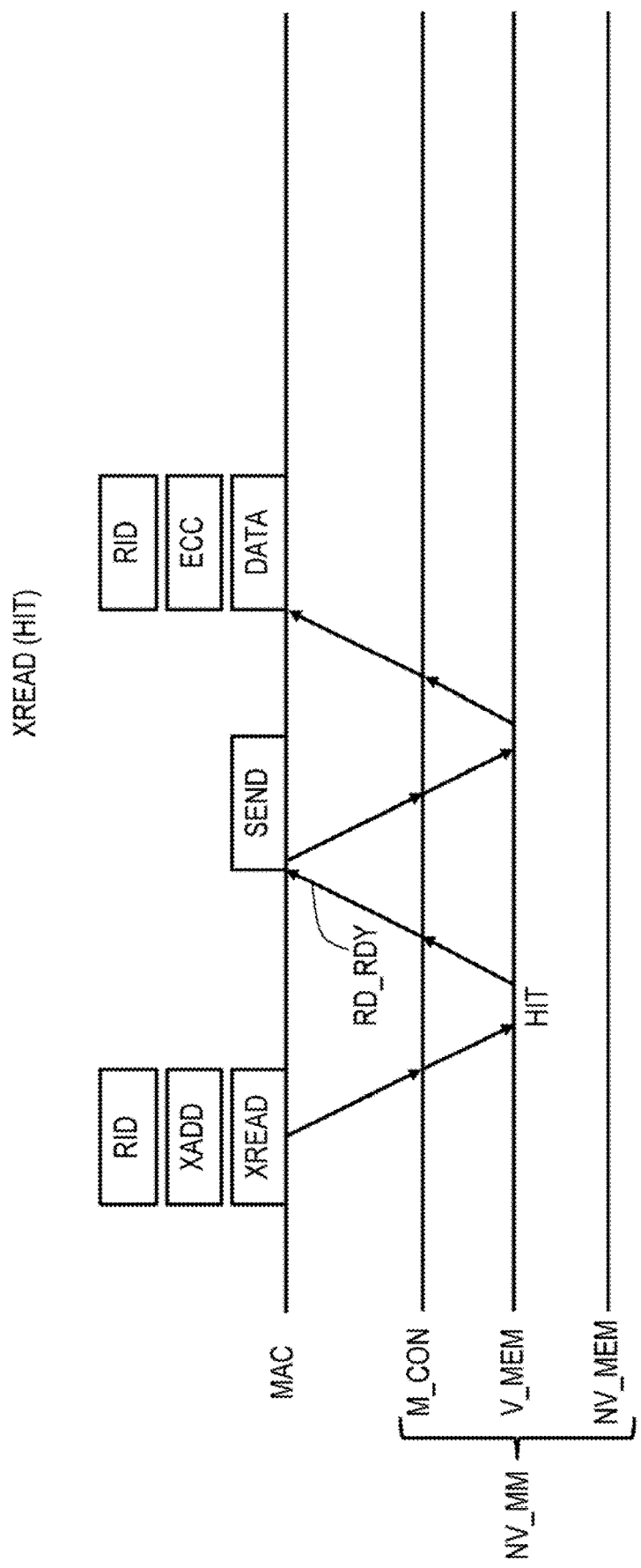
FIG. 2 is a view depicting an operation sequence executed in response to a normal read.
Figure 4:
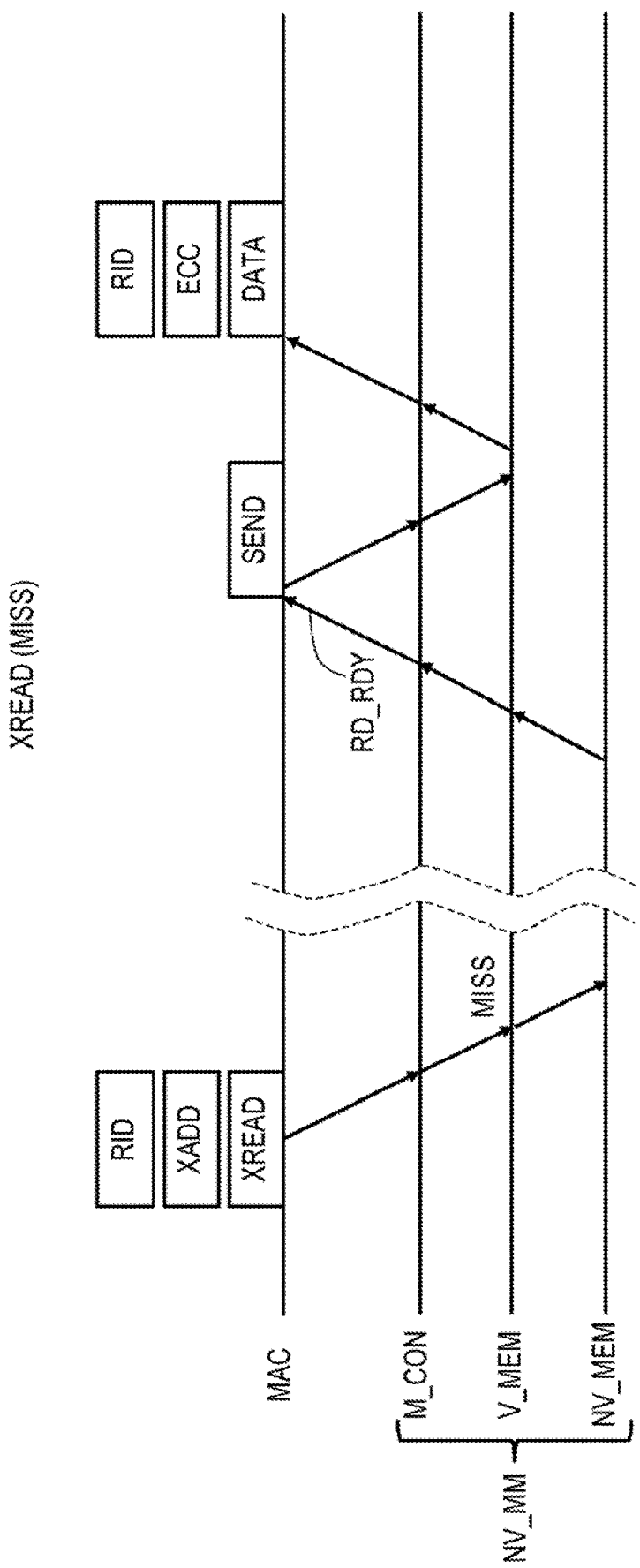
FIG. 4 is a view depicting an operation sequence executed in response to a normal read.

FIGS. 2 and 4 are views depicting an operation sequence executed in response to a normal read. A normal read command is denoted as XREAD, for example. FIGS. 2 and 4 depict the memory access controller MAC, and the memory controller M_CON, the volatile memory V_MEM, and the nonvolatile memory NV_MEM provided in the nonvolatile memory module NV_MM.

Figure 3:
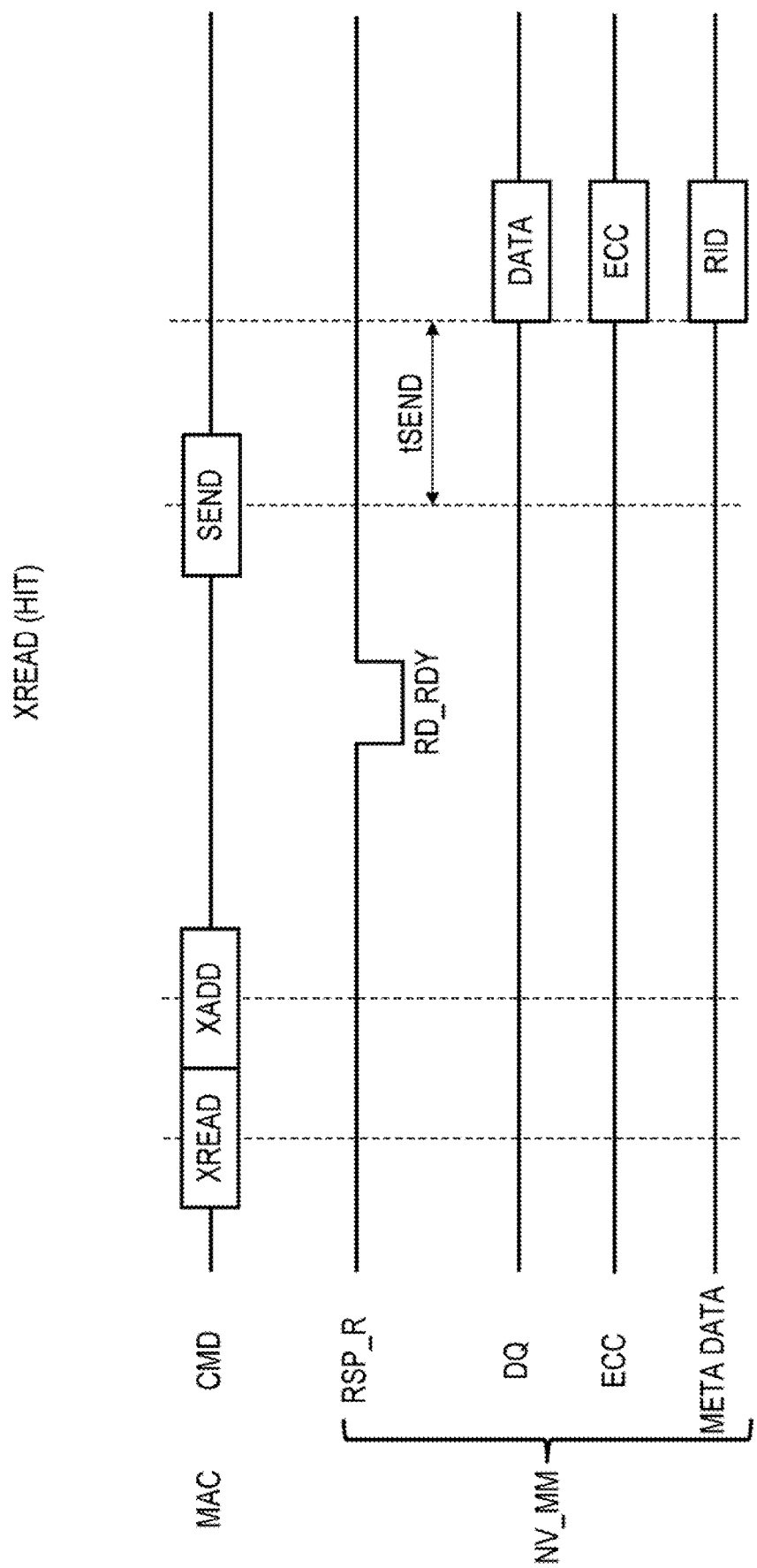
FIG. 3 is a view depicting timing charts of signals exchanged between the memory access controller and the nonvolatile memory module in response to a normal read.
Figure 5:
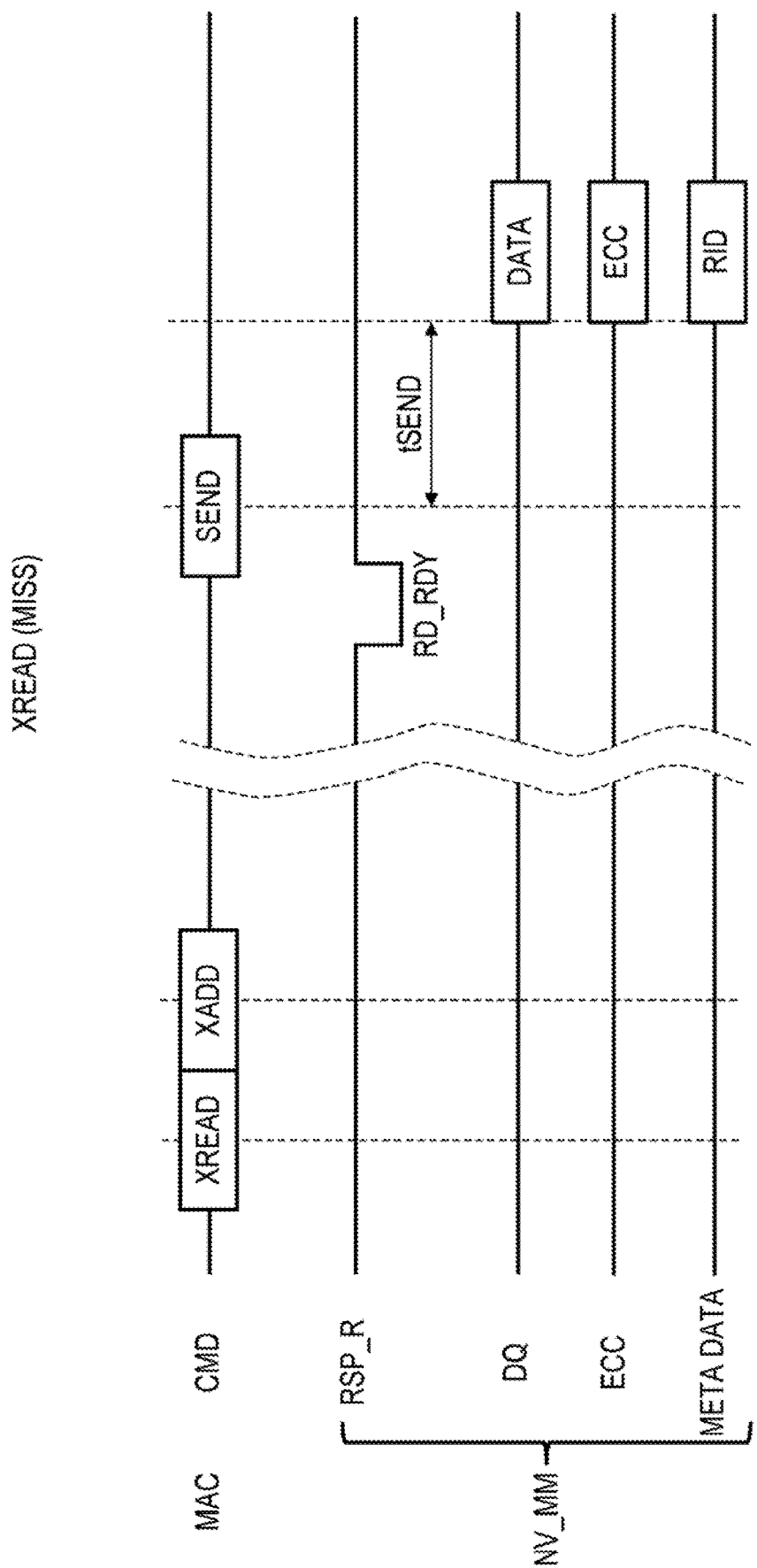
FIG. 5 is a view depicting timing charts of signals exchanged between the memory access controller and the nonvolatile memory module in response to a normal read.

FIGS. 3 and 5 are views depicting timing charts of signals exchanged between the memory access controller and the nonvolatile memory module in response to a normal read. FIGS. 3 and 5 depict a command bus CMD to which the memory access controller MAC outputs commands and so on, a read response signal RSP_R output by the nonvolatile memory module NV_MM, a data bus DQ, an ECC bus ECC, and a metadata signal META_DATA.

When the normal read XREAD depicted in FIGS. 2 and 3 is a cache hit, the following operations are performed. The memory access controller MAC issues the normal read XREAD together with the address XADD thereof to the command bus CMD. A unique read identifier RID is attached to the normal read XREAD.

In response to the normal read XREAD, the memory controller M_CON of the nonvolatile memory module accesses the volatile memory V_MEM, and when a cache hit is obtained such that a data response is possible, transmits a read-ready signal RD_RDY to the memory access controller MAC. In response to the read-ready signal RD_RDY, the memory access controller MAC transmits a transmission request signal SEND to the nonvolatile memory module on the command bus CMD.

After a predetermined time tSEND elapses following issuance of the transmission request signal SEND, the nonvolatile memory module transmits read data DATA to the memory access controller MAC. In addition to the read data DATA, the ECC signal ECC and the read identifier RID are transmitted. The nonvolatile memory module NV_MM, having performed a handshake with the memory access controller MAC through the read-ready signal RD_RDY and the transmission request signal SEND in this manner, then transmits the data to the memory access controller MAC.

In this case, a cache hit is obtained in the volatile memory V_MEM, and therefore the latency from the normal read XREAD to the data response is short, as in the case of a DRAM. Note, however, that the latency is longer than that of a DRAM by an amount corresponding to the handshake.

FIGS. 4 and 5 depict operations performed when the normal read is a cache miss. Similarly to FIGS. 2 and 3, the memory access controller MAC issues the normal read XREAD together with the address XADD thereof to the command bus CMD. The unique read identifier RID is attached to the normal read XREAD.

When the memory controller M_CON of the nonvolatile memory module accesses the volatile memory V_MEM in response to the normal read XREAD and a cache miss is obtained, the memory controller M_CON accesses the nonvolatile memory NV_MEM. Page unit data read from the nonvolatile memory NV_MEM are registered (stored) in the volatile memory, thereby enabling a data response, whereupon the read-ready signal RD_RDY is transmitted to the memory access controller MAC. In response to the read-ready signal RD_RDY, the memory access controller MAC transmits the transmission request signal SEND to the nonvolatile memory module on the command bus CMD.

After the predetermined time tSEND elapses following issuance of the transmission request signal SEND, the nonvolatile memory module transmits the read data DATA to the memory access controller MAC. In addition to the read data DATA, the ECC signal ECC and the read identifier RID are transmitted. Hence, when a cache miss occurs, the nonvolatile memory module NV_MM reads data from the nonvolatile memory and registers the read data in the volatile memory. Then, having performed a handshake with the memory access controller MAC through the read-ready signal RD_RDY and the transmission request signal SEND, the nonvolatile memory module NV_MM transmits the data to the memory access controller MAC.

The latency with respect to the nonvolatile memory NV_MEM is longer than the latency with respect to the volatile memory, and therefore the latency up to data transmission by the nonvolatile memory module in case of a cache miss is considerably longer than that of a case where a cache hit is obtained. For example, in the case of a cache hit, the latency is approximately 60 nsec, whereas in the case of a cache miss, the latency is on average 300 nsec.

Speculative Read SREAD

Figure 6:
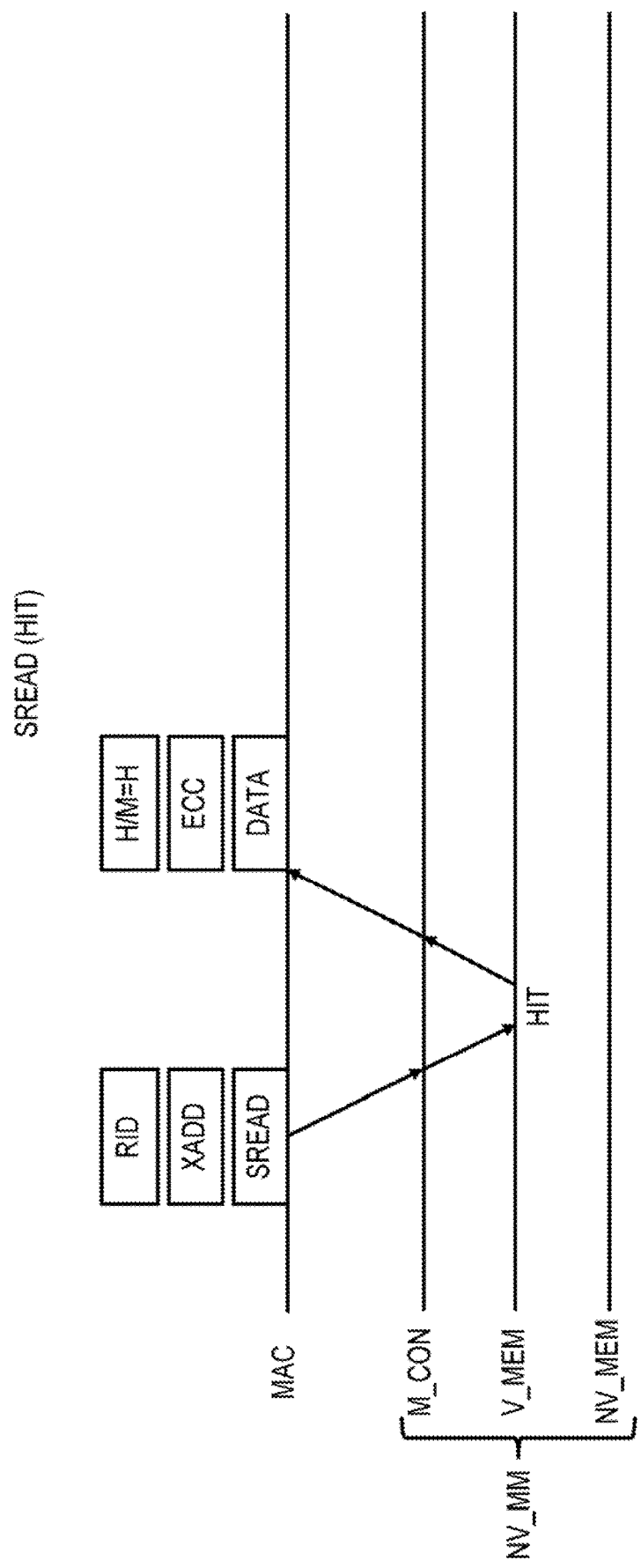
FIG. 6 is a view depicting an operation sequence executed in response to a speculative read.
Figure 7:
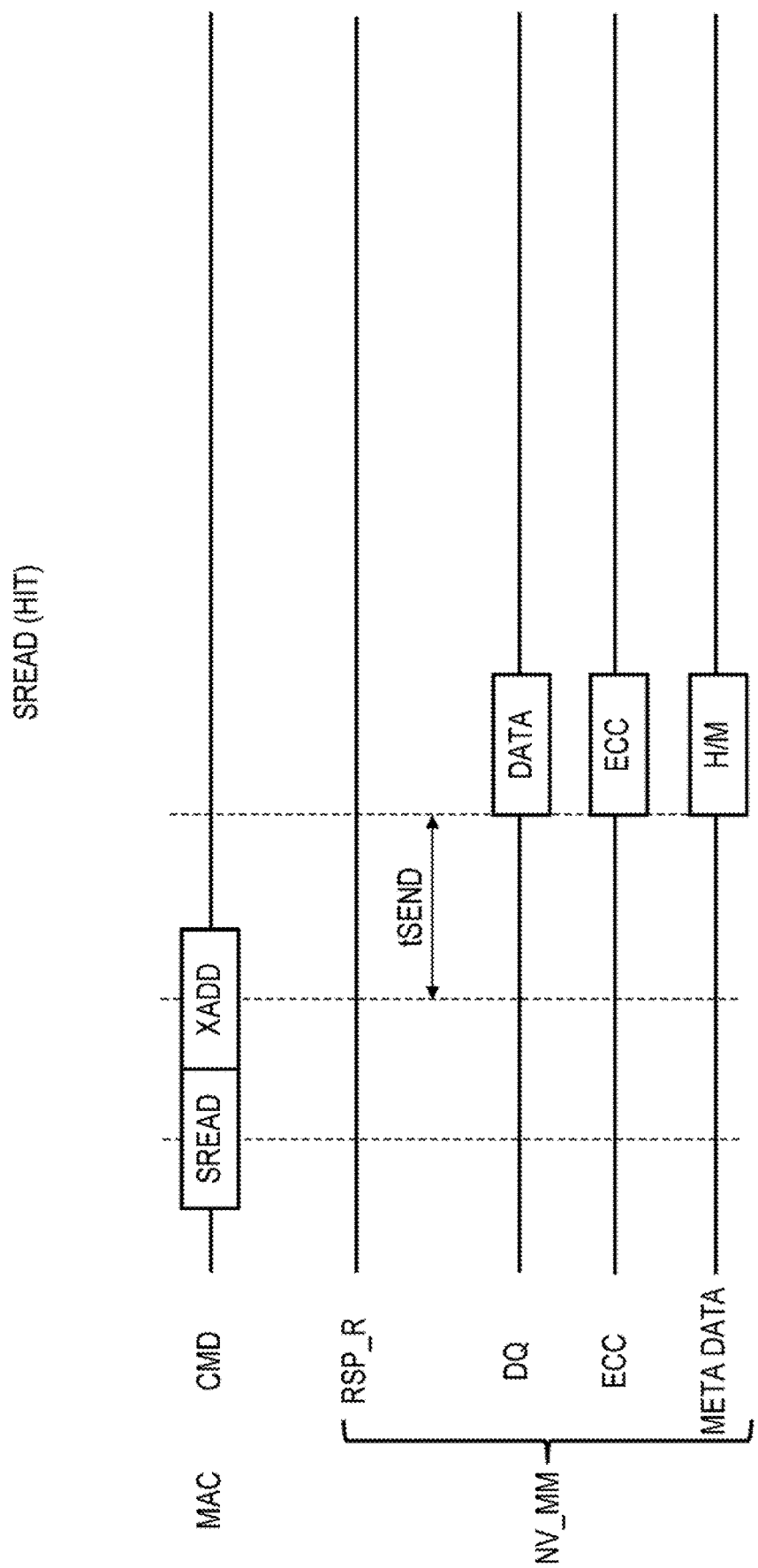
FIG. 7 is a view depicting timing charts of signals exchanged between the memory access controller and the nonvolatile memory module in response to a speculative read.
Figure 8:
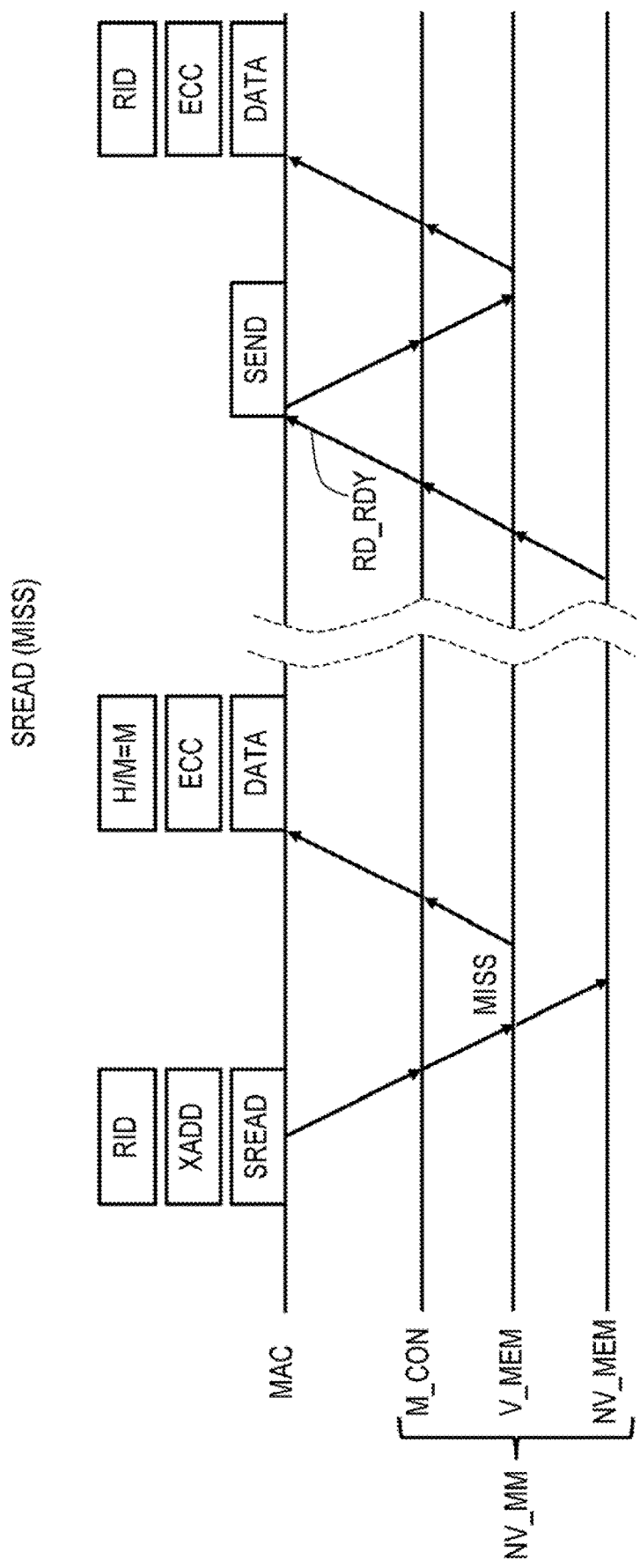
FIG. 8 is a view depicting an operation sequence executed in response to a speculative read.
Figure 9:
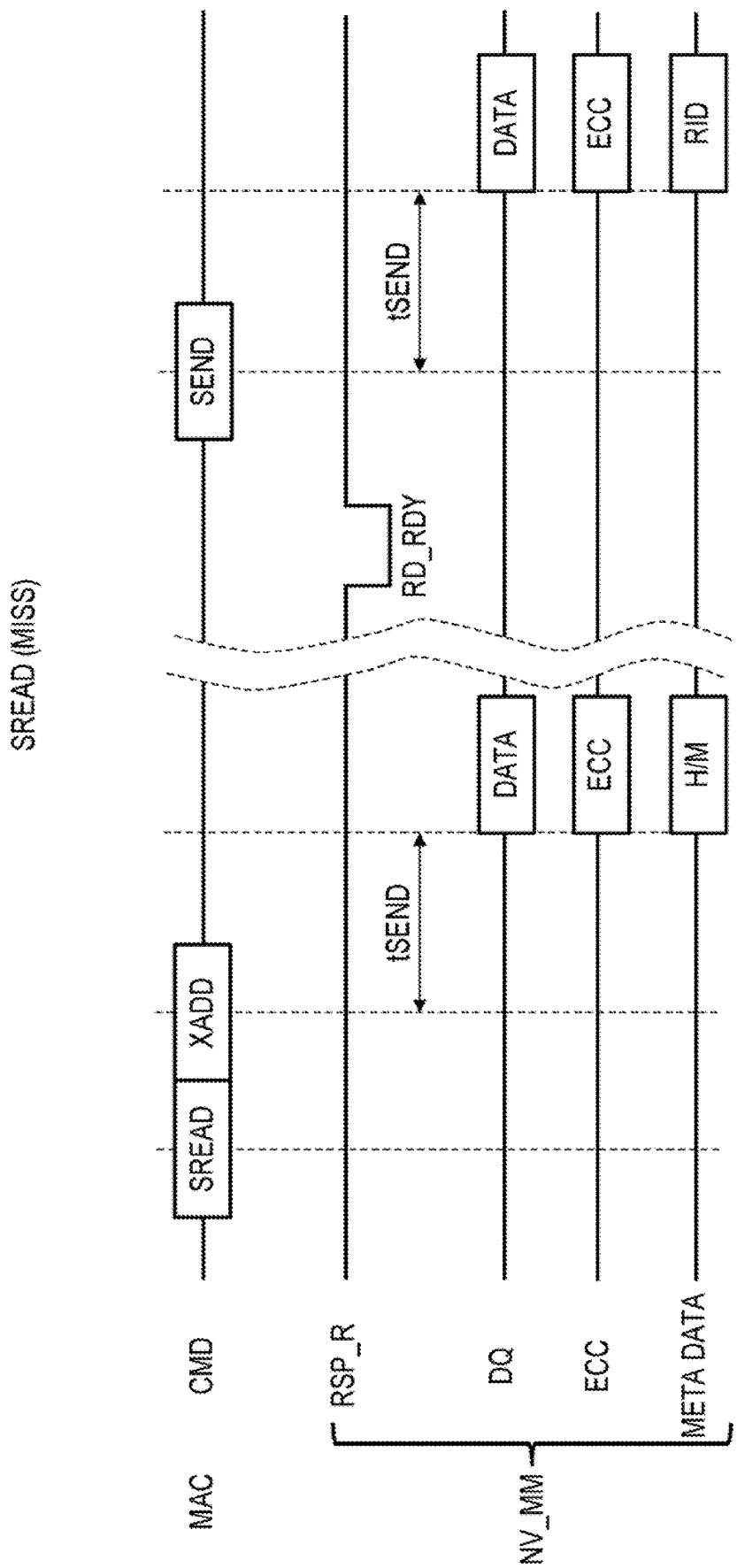
FIG. 9 is a view depicting a timing chart of signals exchanged between the memory access controller and the nonvolatile memory module during in response to the speculative read.

FIGS. 6 and 8 are views depicting an operation sequence executed in response to a speculative read. A speculative read command is denoted as SREAD, for example. FIGS. 7 and 9 are views depicting timing charts of signals exchanged between the memory access controller and the nonvolatile memory module in response to a speculative read.

When the speculative read SREAD depicted in FIGS. 6 and 7 is a cache hit, the following operations are performed. Similarly to the normal read XREAD, the memory access controller MAC issues the speculative read SREAD together with the address XADD thereof to the command bus CMD. The unique read identifier RID is likewise attached to the speculative read SREAD.

In response to the speculative read SREAD, the memory controller M_CON of the nonvolatile memory module accesses the volatile memory V_MEM and, regardless of whether a cache hit or a cache miss is obtained, issues a data response following the predetermined time tSEND from the speculative read SREAD. In the data response, in the case of a cache hit, the nonvolatile memory module transmits data read from the volatile memory together with an ECC code and a cache hit flag H/M to the memory access controller MAC. When the cache hit flag indicates a cache hit, the memory access controller acquires the received data. In the case of a cache miss, on the other hand, the nonvolatile memory module transmits dummy data together with an ECC code and a cache hit flag, and since the cache hit flag indicates a cache miss, the memory access controller discards the received data and waits for the read-ready signal.

As described above, when a cache hit is obtained in response to a speculative read, the nonvolatile memory module issues a data response following the predetermined time tSEND from the speculative read without performing a handshake using the read-ready signal RD_RDY and the transmission request signal SEND. Therefore, an equally short latency to that of a DRAM is realized, and as a result, a shorter latency, for example 30 nsec, than that of a case in which a cache hit is obtained in response to the normal read XREAD (60 nsec) is achieved.

When the speculative read depicted in FIGS. 8 and 9 is a cache miss, the following operations are performed. First, the memory access controller MAC issues the speculative read SREAD together with the address XADD thereof to the command bus CMD. The unique read identifier RID is attached to the speculative read SREAD.

In response to the speculative read SREAD, the memory controller M_CON of the nonvolatile memory module accesses the volatile memory V_MEM and, regardless of whether a cache hit or a cache miss is obtained, issues a data response following the predetermined time tSEND from the speculative read SREAD. In the data response, in the case of a cache miss, the nonvolatile memory module transmits dummy read data together with an ECC code and the cache hit flag H/M to the memory access controller MAC. Since the cache hit flag indicates a cache miss, the memory access controller discards the received data and waits for the read-ready signal.

Meanwhile, since a cache miss has occurred, the memory controller M_CON of the nonvolatile memory module accesses the nonvolatile memory, reads the data in a page area including the read address, and registers the read data in the volatile memory. Further, the nonvolatile memory module transmits the read-ready signal RD_RDY to the memory access controller MAC. In response to the read-ready signal RD_RDY, the memory access controller MAC transmits the transmission request signal SEND to the nonvolatile memory module on the command bus CMD.

After the predetermined time tSEND elapses following issuance of the transmission request signal SEND, the nonvolatile memory module transmits the read data DATA to the memory access controller MAC. In addition to the read data DATA, the ECC signal ECC and the read identifier RID are transmitted.

When the speculative read is a cache miss, a speculative data response is added following the predetermined time tSEND from the speculative read SREAD, and therefore the use efficiency of the bus between the memory access controller and the nonvolatile memory module deteriorates. Hence, when the speculative read is a cache miss, the latency, at an average 400 nsec, for example, is longer that of a case in which a cache miss is obtained in response to a normal read (30 nsec).

FIG. 10 is a view of a table illustrating examples of the latency of the nonvolatile memory module. As illustrated on the table, the latency of the normal read XREAD is 60 nsec in the case of a cache hit and 300 nsec on average in the case of a cache miss, for example. Meanwhile, the latency of the speculative read SREAD is 30 nsec in the case of a cache hit and 400 nsec on average in the case of a cache miss, for example. It is evident from the table that preferably, the memory access controller MAC issues the speculative read SREAD in the case of a cache hit and the normal read XREAD in the case of a cache miss. Conversely, when the speculative read is issued in the case of a cache miss, the increased latency constitutes a large penalty.

Figure 11:
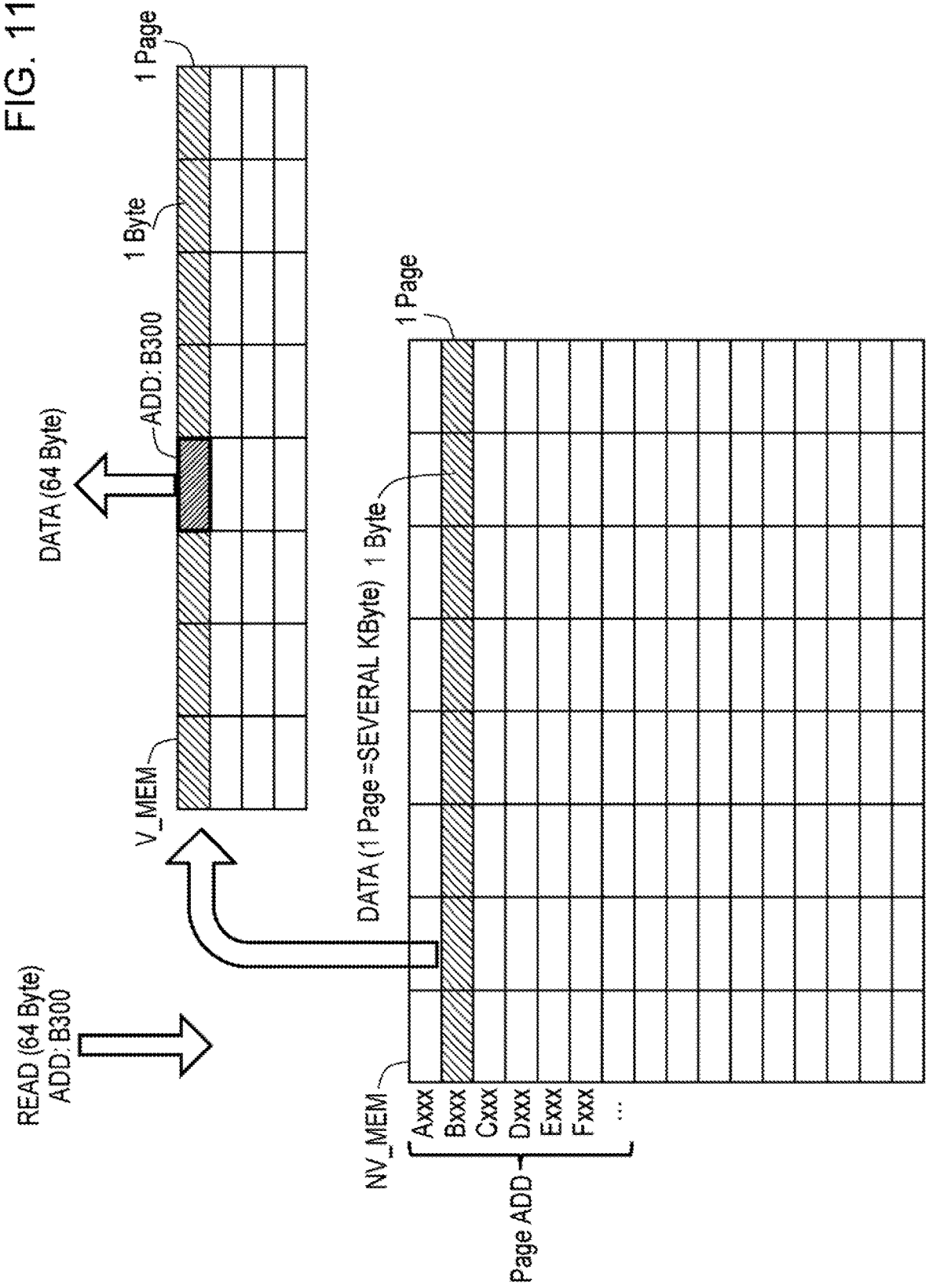
FIG. 11 is a view depicting a relationship between the read data transmitted to the nonvolatile memory module and the two memories thereof.

FIG. 11 is the nonvolatile memory module and a view depicting a relationship between the read data transmitted from the two memories thereof. FIG. 11 illustrates the respective sizes of the read data of the volatile memory V_MEM and the nonvolatile memory NV_MEM of the nonvolatile memory module NV_MM. In the two memories, each row of the matrix denotes a data size corresponding to one page, and the page on each row includes a plurality of bytes. In FIG. 11, for the sake of simplicity, one page includes 8 bytes, but in reality, the data on one page include several kilobytes of data. Further, the number of pages in the nonvolatile memory NV_MEM is greater than the number of pages in the volatile memory V_MEM.

The address of the read destination and the data size are attached to the read READ issued by the memory access controller MAC, and in the example depicted in FIG. 11, the address ADD is B300 and the data size is 64 bytes. In response to the read READ, when a cache hit is obtained in the volatile memory, the nonvolatile memory module reads 64 bytes of data with a single byte of data corresponding to the address B300 at the beginning. When, on the other hand, a cache miss is obtained in the volatile memory, the nonvolatile memory module reads one page of data having a page address Bxxx that includes the address B300 from the nonvolatile memory NV_MEM, and then stores and registers the read data in the volatile memory V_MEM. Further, the nonvolatile memory module transmits 64 bytes of data, with a single byte of data corresponding to the address B300 at the beginning, from the registered page of data to the memory access controller.

In the example described above, the address B300 is an address for a single byte of data, while the address Bxxx is a page address for a single page of data.

As described above, when a cache miss is obtained in the volatile memory at the address B300 of the read READ, the nonvolatile memory module reads one page of data including the read address B300 from the nonvolatile memory and registers the read data in the volatile memory. Accordingly, when the address of a subsequently issued read READ is an address within the single page having the page address Bxxx, such as B100 or B200, the nonvolatile memory module obtains a cache hit in the volatile memory and transmits data read from the volatile memory. Thus, the size (a byte unit) of the data read from the volatile memory is smaller than the size (a page unit) of data read from the nonvolatile memory. Therefore, when a cache miss occurs and a single page of the data in the nonvolatile memory is registered in the volatile memory, if the address of a subsequent read READ is on the same page, the likelihood of a cache hit is high.

Memory Access Controller According to this Embodiment

Figure 12:
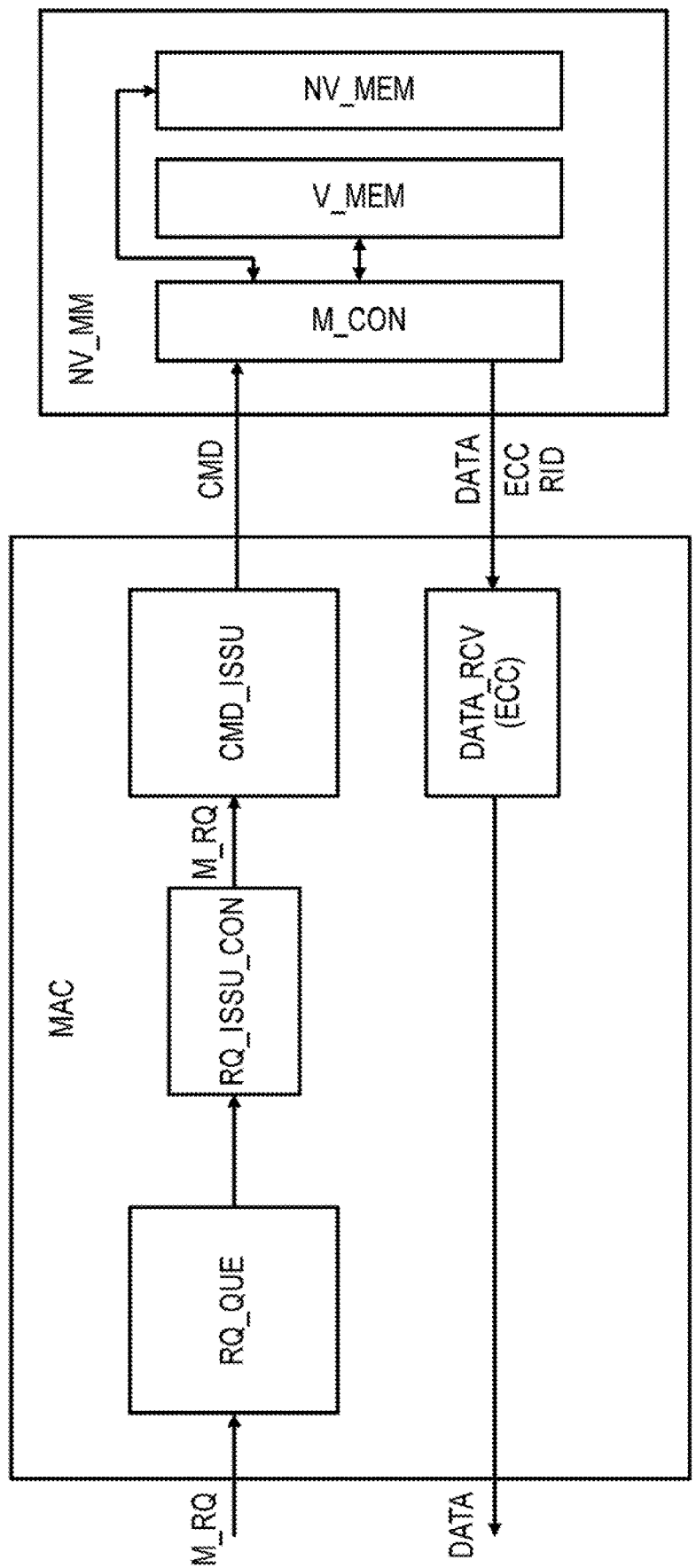
FIG. 12 is a view depicting an example configuration of the memory access controller MAC and the nonvolatile memory module NV_MM according to this embodiment.

FIG. 12 is a view depicting an example configuration of the memory access controller MAC and the nonvolatile memory module NV_MM according to this embodiment. The memory access controller MAC receives a memory request M_RQ issued by the last level cache (the L2 cache in FIG. 1) of the processor, and stores the received memory request in a request queue RQ_QUE. A request issuance controller RQ_ISSU_CON selects an issuable memory request M_RQ from the request queue RQ_QUE. Whether or not a memory request is issuable is based on a read issuance rule such as whether or not a read issuance prohibition period has elapsed in the nonvolatile memory module, for example. When the selected memory request M_RQ is a read request, a command issuance unit CMD_ISSU selects either the normal read XREAD or the speculative read SREAD and issues the selected read to the nonvolatile memory module NV_MM.

The nonvolatile memory module NV_MM is configured similarly to that depicted in FIG. 1. The nonvolatile memory module reads data relating to the received normal read XREAD or speculative read SREAD from the volatile memory or the nonvolatile memory in the nonvolatile memory module and transmits the read data to the memory access controller MAC via a data bus DATA. Together with the read data, the nonvolatile memory module transmits the error correction code ECC, the read identifier RID, and so on of the read data via a different bus.

A data reception unit DATA_RCV of the memory access controller MAC receives the read data DATA, the ECC, and the RID, corrects an error in the data DATA on the basis of the ECC, and transmits the corrected data to the last level cache.

Memory Access Controller According to First Embodiment

Figure 13:
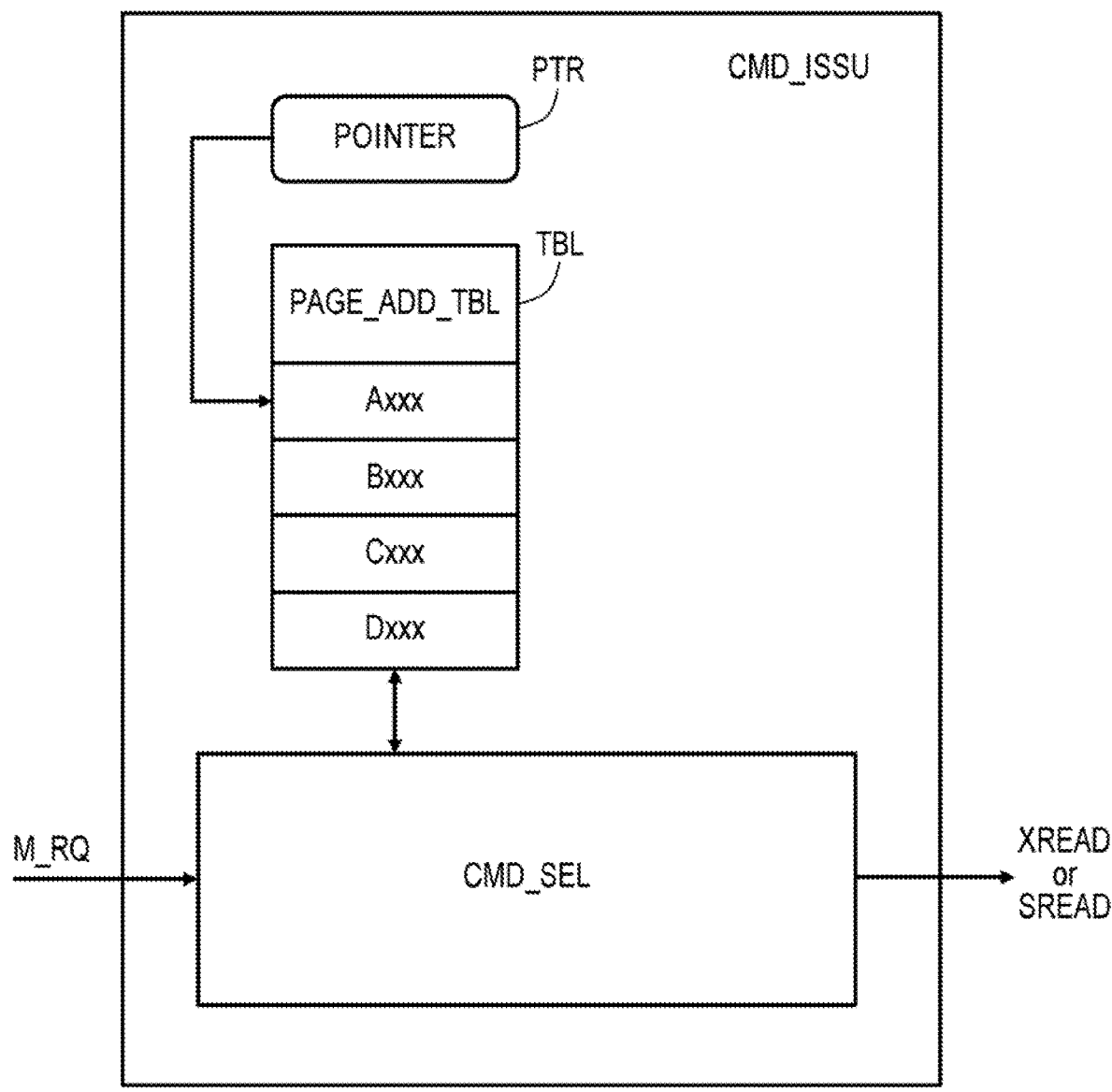
FIG. 13 is a view depicting an example configuration of the command issuance unit CMD_ISSU in a memory access controller according to a first embodiment.

FIG. 13 is a view depicting an example configuration of the command issuance unit CMD_ISSU in a memory access controller according to a first embodiment. The command issuance unit CMD_ISSU includes a page address table TBL on which a plurality of page addresses subject to the speculative read SREAD are registered, a pointer PTR for pointing to an entry in which the page address is to be updated, and a command selection unit CMD_SEL.

As noted above, the nonvolatile memory module stores the address information (the page address) corresponding to the data that have been cache-registered in the volatile memory in the cache tag and, in response to the normal read XREAD or the speculative read SREAD, performs a cache hit determination to determine whether or not the address information in the cache tag hits a read address. On the other hand, the number of entries for storing page addresses on the page address table TBL in the command issuance unit CMD_ISSU is much smaller than the number of entries in the cache tag.

Figure 14:
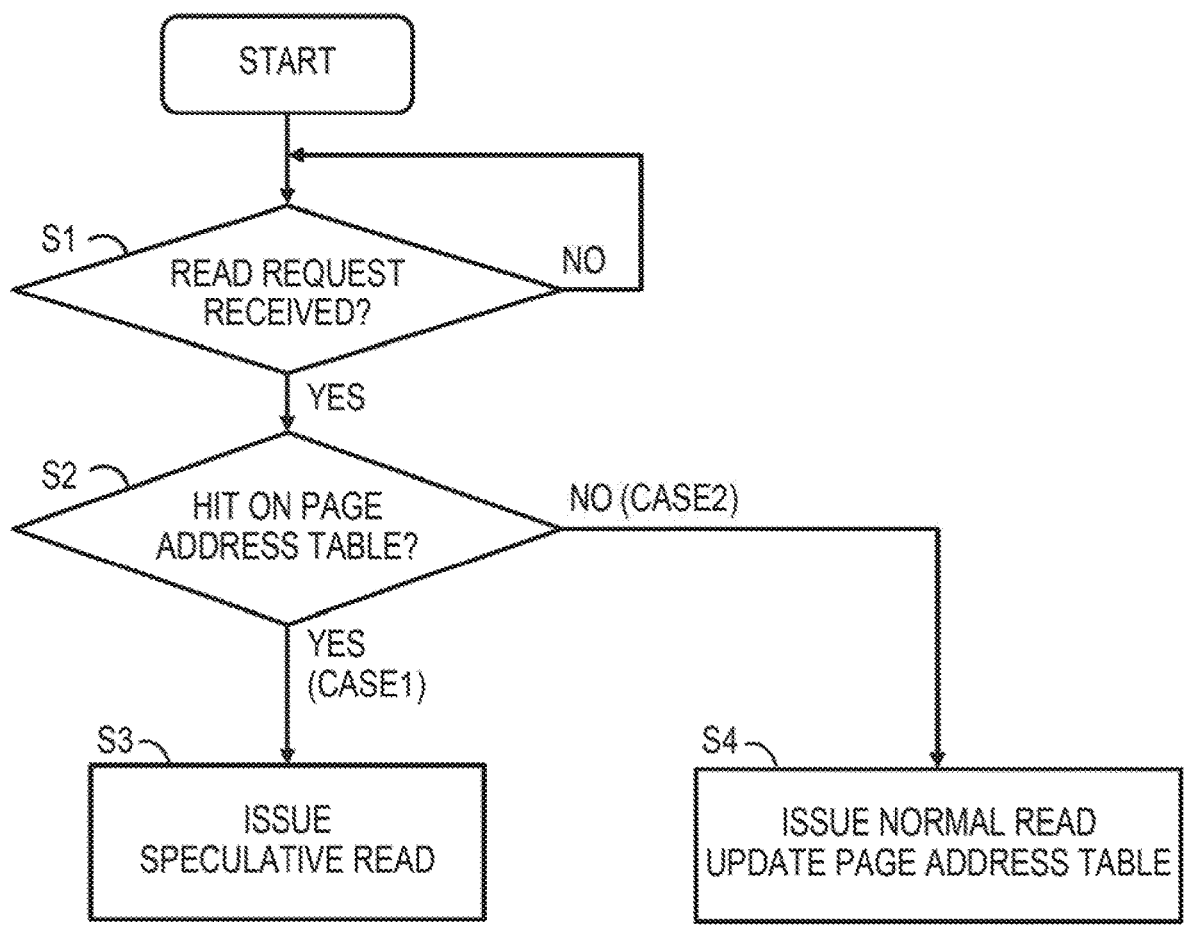
FIG. 14 is a view depicting a flowchart of an example operation of the command issuance unit CMD_ISSU.

FIG. 14 is a view depicting a flowchart of an example operation of the command issuance unit CMD_ISSU. When the input memory request M_RQ is a read request (YES in S1), the command selection unit CMD_SEL selects either the normal read XREAD or the speculative read SREAD by referring to the page address table TBL, and issues the selected read to the nonvolatile memory module.

More specifically, in a case 2 (a miss) in which the address of the read request is not included in any of the page addresses registered on the page address table TBL (NO in S2), the command selection unit CMD_SEL selects the normal read XREAD and issues the selected normal read to the memory module (S4). At the same time, a page address including the address of the read request is registered in an entry pointed to by the pointer PTR on the page address table TBL (S4). At this time, the page address already registered in the entry is replaced with the new page address (S4). Further, the pointer PTR is incremented by +1. The pointer PTR is incremented in order of the index of the page address table (or in the reverse order), for example, every time a page address is updated.

Meanwhile, in a case 1 (a hit) in which the address of the read request is included in one of the page addresses registered on the page address table TBL (YES in S2), the command selection unit CMD_SEL selects and issues the speculative read SREAD (S3). The reason for this is that the likelihood of a cache hit in the memory module is high.

Figure 15:
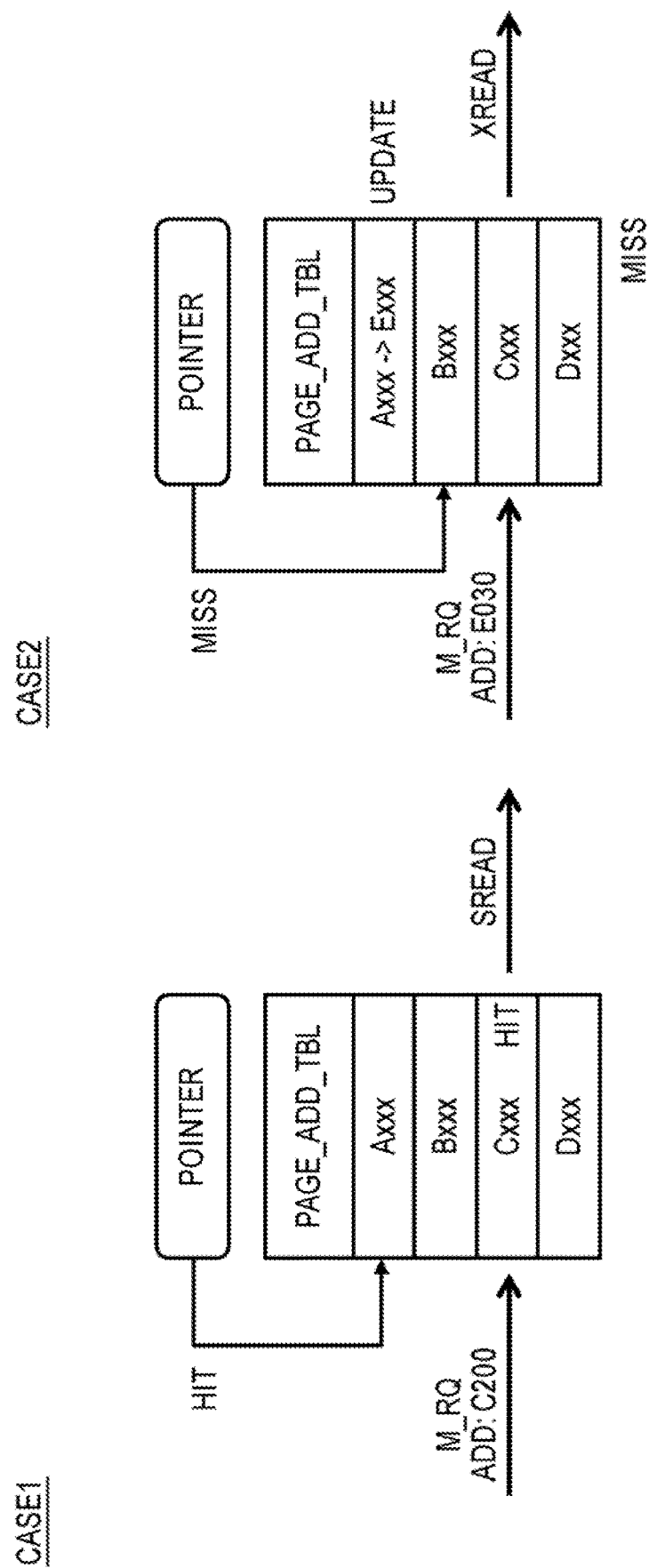
FIG. 15 is a view depicting a specific example of the operations performed by the command issuance unit in cases 1 and 2.

FIG. 15 is a view depicting a specific example of the operations performed by the command issuance unit in case 1 and case 2. As a prerequisite, page addresses Axxx, Bxxx, Cxxx, and Dxxx are registered on the page address table TBL. This means that in the memory module, data having the page addresses Axxx, Bxxx, Cxxx, and Dxxx have been previously stored in the volatile memory.

In case 1 (CASE1), the address ADD of the read request is a byte address C200, which is included in the page address Cxxx on the page address table, and therefore a page address table hit HIT occurs. Accordingly, the command selection unit CMD_SEL issues the speculative read SREAD in response to the read request.

In case 2 (CASE2), on the other hand, the address ADD of the read request is a byte address E030, which is not included in any of the page addresses on the page address table, and therefore a page address table miss MISS occurs. Accordingly, the command selection unit CMD_SEL issues the normal read XREAD in response to the read request. Further, the command selection unit performs update processing UPDATE to replace the page address Axxx pointed to by the pointer PTR with a new page address Exxx that includes the address E030 of the read request, whereby the pointer PTR is incremented by one.

In case 2 (a miss), in which the address of the read request is not included in any of the page addresses registered on the page address table, the memory access controller selects and issues the normal read XREAD and registers a page address including the address of the read request on the page address table. The nonvolatile memory module to which the normal read XREAD is issued, accesses the nonvolatile memory when a cache miss in the cache tag occurs, reads the data of a single page having a page address that includes the read address, and registers the read data in the volatile memory.

Thus, thereafter, when the case 1, in which the address of the read request M_RQ selected from the request queue RQ_QUE is included in one of the page addresses registered on the page address table, occurs, the likelihood of a cache hit in the nonvolatile memory module is high. Accordingly, the command issuance unit CMD_ISSU of the memory access controller issues the speculative read SREAD in response to the aforesaid read request. The speculative read SREAD is highly likely to result in a cache hit in the nonvolatile memory module, and it is therefore likely that the nonvolatile memory module will be able to attach the hit flag to the response data in a hit state and transmit the response data thus to the memory access controller MAC without performing a handshake. As a result, it is likely that the memory access controller will be able to acquire the data with the minimum latency of the speculative read SREAD.

Conversely, when the case 2, in which the address of the read request is not included in any of the registered page addresses, occurs, the likelihood of a cache hit is lower than in case 1. Accordingly, the command selection unit CMD_SEL selects and issues the normal read XREAD. Even if the normal read XREAD results in a cache miss in the nonvolatile memory module, for example, the latency thereof is shorter than the latency produced by a cache miss in response to the speculative read SREAD, and therefore a situation in which data are received with the maximum latency produced by a cache miss in response to the speculative read SREAD can be avoided.

As noted above, however, the number of entries on the page address table in the memory access controller MAC is smaller than the number of entries of the cache tag provided in the nonvolatile memory module, and therefore the page address on the page address table does not always match the page address in the cache tag of the nonvolatile memory module. Hence, the normal read XREAD may also result in a cache hit, and the speculative read SREAD may also result in a cache miss.

Memory Access Controller According to Second Embodiment

When the processor that issues read requests to the nonvolatile memory module has a plurality of cores, as depicted in FIG. 1, the plurality of cores issue read requests separately during the processes executed respectively thereby. It is therefore to be expected that the addresses of the read requests issued respectively by the plurality of cores will be random addresses. However, it is also generally foreseeable that the addresses of the read requests issued by a single core will exhibit temporal locality and spatial locality so as to be concentrated in a certain address area within a certain time period.

Meanwhile, when compared with the number of entries in the cache tag provided in the nonvolatile memory module, the number of entries on the page address table provided in the memory access controller may be extremely small. For example, when the memory access controller MAC is built into the chip of the processor CPU, a fixed upper limit is set on the number of entries on the page address table.

When a nonvolatile memory module is used as the main memory of a multicore processor, as described above, the addresses of the read requests from the multiple cores are random addresses among the plurality of cores. Moreover, the number of entries on the page address table in the memory access controller is limited to a small number. Therefore, when the page address table is updated every time case 2 occurs, as in the first embodiment, a situation in which, before a read request having an address that is included in a page address newly registered on the page address table can be input again following registration, the page address is removed from the page address table occurs frequently. In this case, the number of entries in the cache tag provided in the nonvolatile memory module is large, and therefore the re-input read request results in a hit in the cache tag but a miss on the page address table. As a result, a likelihood that the speculative read SREAD can read with minimum latency becomes smaller.

Hence, in the second embodiment, rather than updating the page address table every time case 2 occurs, the page address table is updated at a lower frequency than the occurrence frequency of case 2. For example, the page address table is updated once each time the case 2 occurs a predetermined number of times. Alternatively, the page address table is updated once each time the case 1 occurs a predetermined number of times. Alternatively, the page address table is updated once each time a predetermined number of read requests are issued.

Figure 16:
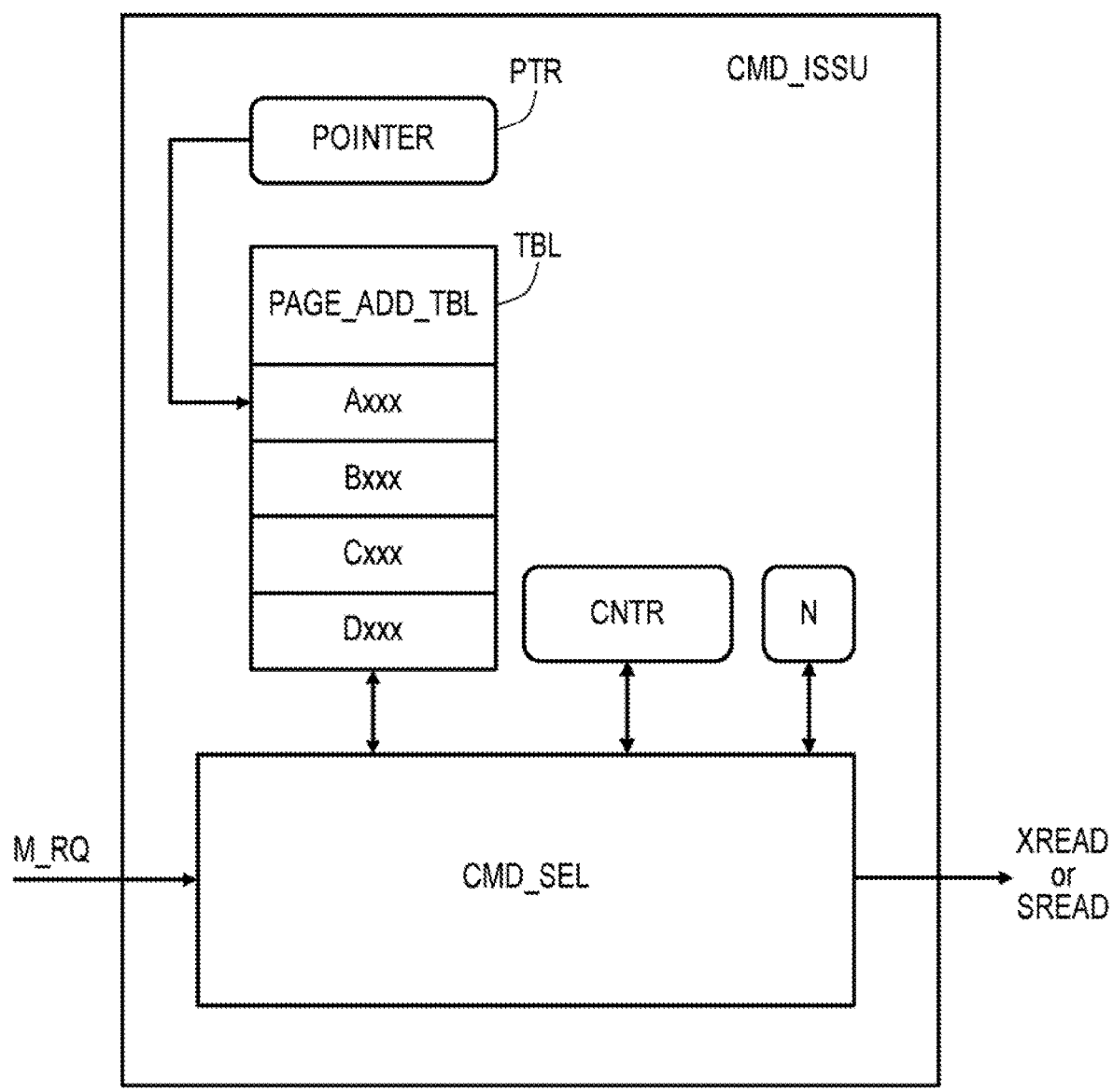
FIG. 16 is a view depicting an example configuration of the command issuance unit CMD_ISSU provided in the memory access controller according to the second embodiment.

FIG. 16 is a view depicting an example configuration of the command issuance unit CMD_ISSU provided in the memory access controller according to the second embodiment. Similarly to the first embodiment, the command issuance unit CMD_ISSU includes the page address table TBL on which a plurality of page addresses subject to the speculative read SREAD are registered, the pointer PTR for pointing to an entry in which the page address is to be updated, and the command selection unit CMD_SEL. The command issuance unit CMD_ISSU further includes a counter CNTR for counting the read requests from the cores and so on, and a register N storing a predetermined number of times N. The counter CNTR counts the number of times case 2 occurs, the number of times case 1 occurs, or the number of read requests. When the counter CNTR reaches a predetermined number of times, for example N times, in case 2, the page address table is updated with a new page address. Further, the predetermined number of times N in the register N may be rewritten (modified) by a user or the like.

Figure 17:
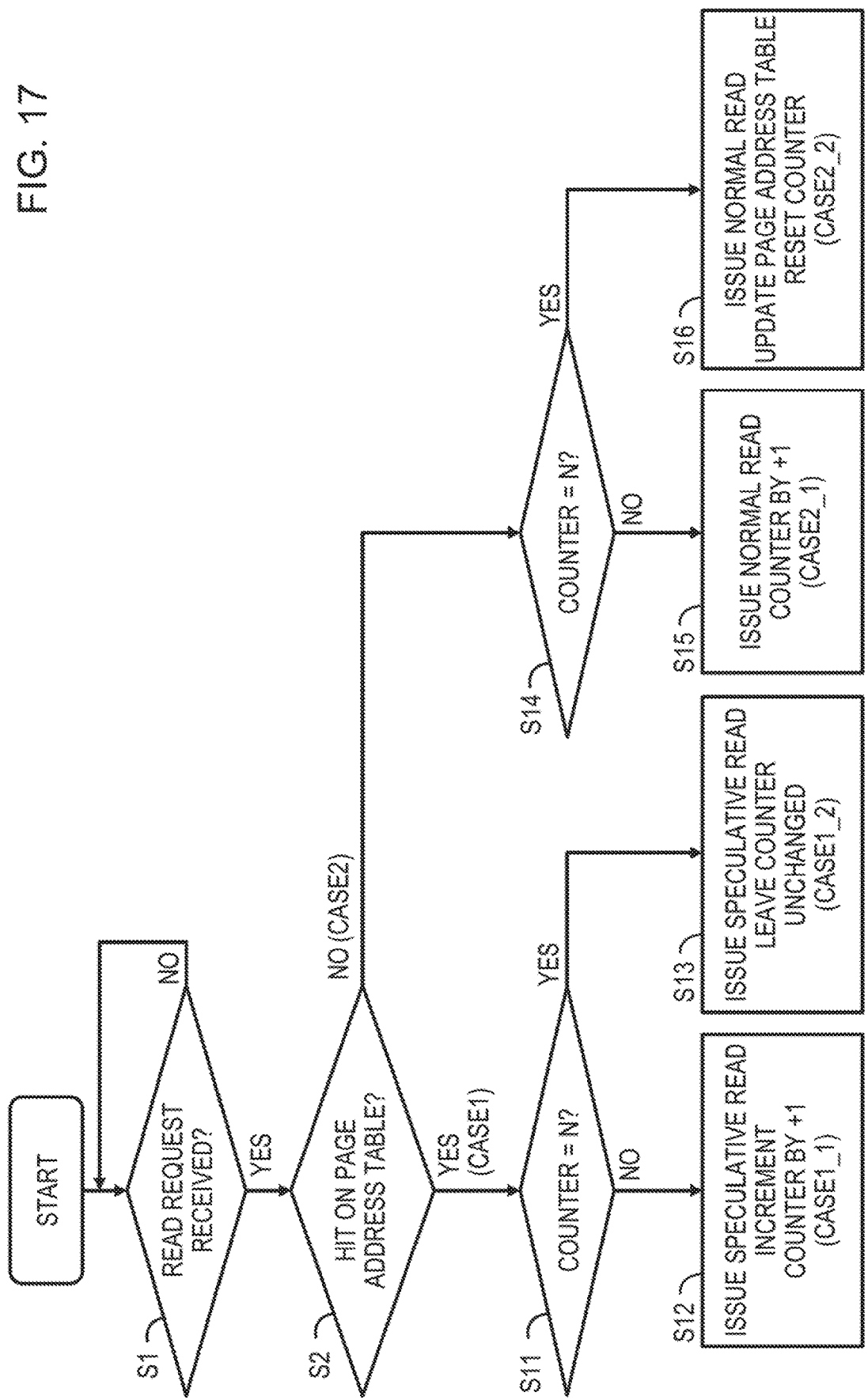
FIG. 17 is a view depicting a flowchart of an example operation of the command issuance unit CMD_ISSU.

FIG. 17 is a view depicting a flowchart of an example operation of the command issuance unit CMD_ISSU. In this example, the counter CNTR counts the number of read requests.

First, when the input memory request M_RQ is a read request (YES in S1), the command selection unit CMD_SEL selects either the normal read XREAD or the speculative read SREAD by referring to the page address table TBL, and issues the selected read to the nonvolatile memory module.

The command selection unit CMD_SEL determines whether the address of the input read request corresponds to case 1 (a hit), in which the address is included in one of the page addresses registered on the page address table, or case 2 (a miss), in which the address is not included in any of the page addresses (S2).

In case 1 (a hit) (YES in S2), when the counter CNTR has not yet reached the predetermined number of times N (NO in S11), the command selection unit CMD_SEL selects and issues the speculative read SREAD and increments the counter by +1 (S12). When, on the other hand, the counter CNTR has reached the predetermined number of times N (YES in S11), the command selection unit CMD_SEL selects and issues the speculative read SREAD but does not increment the counter (S13).

Conversely, when case 2 (a miss) is determined in S2 and the counter CNTR has not yet reached the predetermined number of times N (NO in S14), the command selection unit CMD_SEL selects and issues the normal read XREAD and increments the counter by +1 (S15). When, on the other hand, the counter CNTR has reached the predetermined number of times N (YES in S14), the command selection unit CMD_SEL selects and issues the normal read XREAD, replaces or updates the entry pointed to by the pointer on the page address table with a page address that includes the address of the read request, and resets the counter to 0 (S16).

Figure 18:
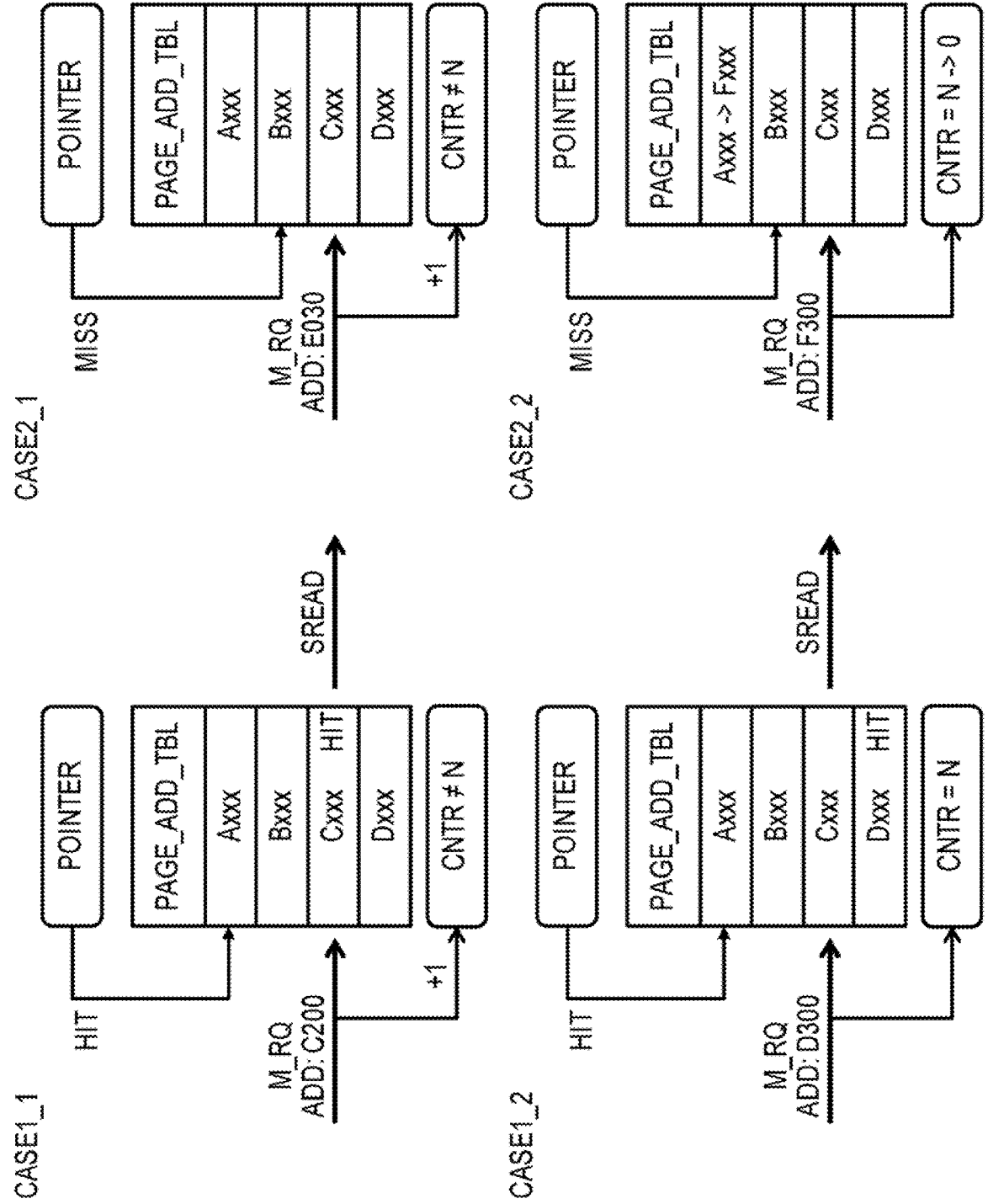
FIG. 18 is a view depicting specific examples of operations performed by the command issuance unit in a plurality of cases.

FIG. 18 is a view depicting specific examples of operations performed by the command issuance unit in a plurality of cases. As a prerequisite, the page addresses Axxx, Bxxx, Cxxx, and Dxxx are registered on the page address table TBL.

In case 1_1 (CASE1_1), the memory request M_RQ is a read request, and the address ADD of the read request is the byte address C200, which is included in the page address Cxxx on the page address table. Therefore, the address ADD is a hit HIT. Accordingly, the command selection unit CMD_SEL issues the speculative read SREAD. Further, since the counter has not yet reached N, the command selection unit increments the counter by +1 (S12).

In case 2_1 (CASE2_1), meanwhile, the memory request is a read request, and the address ADD of the read request is the byte address E030, which is not included in any of the page addresses on the page address table.

Therefore, the address ADD is a miss MISS. Accordingly, the command selection unit CMD_SEL issues the normal read XREAD. Further, since the counter has not yet reached N, the command selection unit increments the counter by +1 (S15). Note, however, that since the counter has not yet reached N, the command selection unit does not update the page address table with a new page address.

Next, in case 1_2 (CASE1_2), the address ADD of the memory request is a byte address D300, which is included in the page address Dxxx on the page address table, and therefore the address ADD is a hit HIT. Accordingly, the command selection unit CMD_SEL issues the speculative read SREAD. Further, the counter has reached N, and therefore the command selection unit does not increment the counter (S13).

Finally, in case 2_2 (CASE2_2), the address ADD of the memory request is a byte address F300, which is not included in any of the page addresses on the page address table, and therefore the address ADD is a miss MISS. Accordingly, the command selection unit CMD_SEL issues the normal read XREAD (S16). Further, since the counter has reached N, the command selection unit CMD_SEL performs the update processing UPDATE to replace the page address Axxx pointed to by the pointer PTR with a new page address Fxxx that includes the address F300 of the read request, and resets the pointer PTR to 0 (S16).

FIG. 19 is a view depicting an example operation in a case where the memory access controller updates the page address table every time a miss occurs. In FIG. 19, the address of the read request and the issued normal read XREAD or speculative read SREAD are depicted on the left side along a temporal axis t extending in a vertical direction, and example transitions of the page address table corresponding to times 0-16 are depicted on the right side. In this example, the page address table includes 4 entries. The read request addresses on the left side are written as 4-bit hexadecimals, and on a page address table P_ADD_TBL on the right side, page addresses in which the most significant bit of the read request address is displayed as the most significant bit and the 3 lower order bits are displayed as "x" are written in the entries of indices 0 to 3 pointed to by a pointer P.

The read request addresses extending along the temporal axis t on the left side are examples from a multicore processor and are therefore random. The page address table on the right side is updated with a new page address at each of times 4, 5, 6, 7, 8, 10, 11, 12, 13, 14, 15, and 16.

In this example, an address "5F40" of a read request issued at time 9 is a hit in a page address "5xxx" registered on the page address table at time 5, and therefore the speculative read SREAD is issued at time 9. At all of the other times, however, no page address including the address of the read request is registered on the table, and therefore a miss is obtained and the normal read XREAD is issued. This is because the page address table is updated every time a miss occurs.

FIG. 20 is a view depicting an example operation in which the memory access controller updates the page address table once every N read requests. The example addresses on the temporal axis on the left side are the same as those of FIG. 19.

In this case, the page address table on the right side is not updated with new page addresses from times 0-15, but a page address update is performed at time 16. As regards the issued reads depicted along the temporal axis on the left side, the speculative read SREAD is issued at times 8, 10, 12, and 13. By updating the page address table at a lower frequency than the frequency with which a miss in case 2 occurs, the speculative read SREAD can be issued appropriately even when the number of entries on the page entry table is small and read requests having random read addresses are input. As a result, the frequency with which data are acquired with the short latency produced by a cache hit in response to the speculative read can be increased.

The predetermined number of times N indicating the update frequency of the page address table is preferably set at an optimum value in consideration of various factors. For example, (1) the predetermined number of times N is larger as the ratio of the number of entries in the cache tag in the memory module to the number of entries in the page address table is smaller, leading to a reduction in the frequency with which a page address registered on the page address table is replaced with a page address that includes the address of the read request, (2) the predetermined number of times N is larger as the number of cores that issue read requests to the memory module is larger, leading to a reduction in the frequency with which a registered page address is replaced with a page address that includes the address of the read request, and (3) by causing the processor to execute a predetermined program while modifying the predetermined number of times N, the predetermined number of times N is set so as to minimize the average latency. In the above (1), it is preferable that the replaced frequency of the page address table is lower, when the number of entries in the page address table is smaller.

FIG. 21 is a view depicting a comparison between a case in which either only the normal read XREAD is issued or only the speculative read SREAD is issued and a case such as that of the second embodiment, in which either XREAD or SREAD is issued depending on whether a hit occurs on the page address table. On each of the two comparison graphs, the horizontal axis depicts the hit rate in the cache tag of the volatile memory V_MEM and the vertical axis depicts the average latency. FIG. 21 illustrates the results of a simulation in which read request addresses were generated at random, as in FIGS. 19 and 20.

In the comparison between the second embodiment and a case where only the speculative read SREAD is issued, in the second embodiment, the normal read XREAD is issued appropriately with steadily greater frequency as the cache hit rate decreases, and as a result, the difference in latency between the cases increases. Conversely, in the comparison between the second embodiment and a case where only the normal read XREAD is issued, in the second embodiment, the speculative read SREAD is issued appropriately with steadily greater frequency as the cache hit rate increases, and as a result, the difference in latency between the cases increases. In both comparisons, the average latency of the second embodiment is shorter than that of the comparison subject.

According to this embodiment, as described above, normal reads and speculative reads are selected and issued appropriately in response to read requests issued to a nonvolatile memory module that mounts a volatile memory and a nonvolatile memory, and as a result, the average latency can be shortened.

According to the embodiments, normal reads and speculative reads can be selected appropriately, and as a result, the latency up to the acquisition of read data can be shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   an arithmetic circuit configured to issue a read request to a memory; and
   a memory access controller configured to perform access control corresponding to the read request from the arithmetic circuit on a memory module including a volatile memory, which has a first capacity and is able to read with a first latency, and a nonvolatile memory, which has a second capacity that is larger than the first capacity and is able to read with a second latency that is longer than the first latency, the volatile memory operating as a cache of the nonvolatile memory,
   the memory access controller is configured to:
   store an address table including a plurality of entries in which unit addresses each of which includes a request address of the read request from the arithmetic circuit are registered;
   issue a speculative read to the memory module in response to receiving the read request in a first case in which the request address is included in one of the unit addresses stored in the address table;
   issue a normal read to the memory module in response to receiving the read request in a second case in which the request address is not included in any of the unit addresses registered on the address table, and replace, at a predetermined timing, one of the unit addresses registered in the address table with a unit address that includes the request address of the normal read request that is received;
   when the normal read is issued, transmit a transmission request signal in response to a read-ready signal from the memory module and receive read data after a first time elapses following transmission of the transmission request signal; and
   when the speculative read is issued, acquire read data when receiving a hit flag and the read data from the memory module and discard the read data when receiving a miss flag and the read data.

2. The arithmetic processing device according to claim 1, wherein
   the arithmetic circuit includes a plurality of arithmetic circuits, each of the plurality of arithmetic circuits issues the read request, and
   in every time the second case occurs, the memory access controller replaces one of the unit addresses registered in the address table with the unit address that includes the request address of the normal read request that is received.

3. The arithmetic processing device according to claim 1, wherein
   the memory access controller counts either a number of read requests from the plurality of arithmetic circuits, a number of times the first case occurs, or a number of times the second case occurs, and
   in the second case, the memory access controller replaces one of the unit addresses registered in the address table with the unit address including the request address of the normal read request that is received and clears the counted value when the counted value has reached a reference value, and does not perform the replacement when the counted value is lower than the reference value.

4. The arithmetic processing device according to claim 1, wherein
   the memory module, in response to the normal read or the speculative read, refers to a cache tag in which information of the unit addresses is registered to check whether or not information of the unit address including a read address of the normal read or the speculative read is registered in the cache tag, and
   the number of the plurality of entries in the address table is smaller than the number of entries in the cache tag.

5. The arithmetic processing device according to claim 4, wherein a frequency with which the unit addresses registered in the address table are replaced with the unit address including the request address of the normal read request that is received is set in accordance with a ratio of the number of entries in the cache tag relative to the number of the plurality of entries on the address table is lower.

6. The arithmetic processing device according to claim 4, wherein a frequency with which the unit addresses registered in the address table are replaced with the unit address including the request address of the normal read request that is received is set in accordance with a number of the plurality of arithmetic circuits is larger.

7. The arithmetic processing device according to claim 1, wherein the memory access controller replaces the unit addresses least recently registered in the plurality of entries in the address table with the unit address including the request address of the normal read request that is received.

8. The arithmetic processing device according to claim 1, wherein the frequency with which the unit addresses registered in the address table are replaced with the unit address including the request address of the normal read request that is received is modifiable.

9. The arithmetic processing device according to claim 4, wherein the frequency with which the unit addresses registered in the address table are replaced with the unit address including the request address of the normal read request that is received is modifiable.

10. An information processing device comprising:
    a memory module including a volatile memory that has a first capacity and is able to read with a first latency, and a nonvolatile memory that has a second capacity, which is larger than the first capacity, and is able to read with a second latency, which is longer than the first latency, the volatile memory operating as a cache of the nonvolatile memory, and
    an arithmetic processing device configured to be able to access the memory module,
    the arithmetic processing device comprising:
    an arithmetic circuit configured to issue a read request to the memory module; and
    a memory access controller configured to perform access control corresponding to the read request from the arithmetic circuit on the memory module,
    the memory access controller is configured to:
    store an address table including a plurality of entries in which unit addresses each of which includes a request address of the read request from the arithmetic circuit are registered;
    issue a speculative read to the memory module in response to receiving the read request in a first case in which the request address is included in one of the unit addresses stored in the address table;

issue a normal read to the memory module in response to receiving the read request in a second case in which the request address is not included in any of the unit addresses registered on the address table, and replace, at a predetermined timing, one of the unit addresses registered in the address table with a unit address that includes the request address of the normal read request that is received;

when the normal read is issued, transmit a transmission request signal in response to a read-ready signal from the memory module and receive read data after a first time elapses following transmission of the transmission request signal; and when the speculative read is issued, acquire read data when receiving a hit flag and the read data from the memory module and discard the read data when receiving a miss flag and the read data.

11. A control method for an arithmetic processing device, the control method comprising:

the arithmetic processing device including:

an arithmetic circuit configured to issue a read request to a memory; and a memory access controller configured to perform access control corresponding to the read request from the arithmetic circuit on a memory module including a volatile memory, which has a first capacity and is able to read with a first latency, and a nonvolatile memory, which has a second capacity that is larger than the first capacity and is able to read with a second latency that is longer than the first latency, the volatile memory operating as a cache of the nonvolatile memory, and configured to store an address table including a plurality of entries in which unit addresses each of which includes a request address of the read request from the arithmetic circuit are registered, the memory access controller of the arithmetic processing device:

issuing a speculative read to the memory module in response to receiving the read request in a first case in which the request address is included in one of the unit addresses stored in the address table;

issuing a normal read to the memory module in response to receiving the read request in a second case in which the request address is not included in any of the unit addresses registered on the address table, and replacing, at a predetermined timing, one of the unit addresses registered in the address table with a unit address that includes the request address of the normal read request that is received;

when the normal read is issued, transmitting a transmission request signal in response to a read-ready signal from the memory module and receiving read data after a first time elapses following transmission of the transmission request signal; and when the speculative read is issued, acquiring read data when receiving a hit flag and the read data from the memory module and discarding the read data when receiving a miss flag and the read data.

* * * * *